United States Patent
Adachi et al.

(10) Patent No.: US 11,973,251 B2
(45) Date of Patent: Apr. 30, 2024

(54) FUEL CELL AND FUEL CELL SEPARATOR

(71) Applicant: TOYOTA JIDOSHA KABUSHIKI KAISHA, Toyota (JP)

(72) Inventors: Makoto Adachi, Susono (JP); Naoki Takehiro, Sunto-gun (JP); Masaaki Matsusue, Mishima (JP); Masayuki Ito, Sunto-gun (JP); Hideo Nagaosa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 473 days.

(21) Appl. No.: 17/443,907

(22) Filed: Jul. 28, 2021

(65) Prior Publication Data
US 2021/0359322 A1 Nov. 18, 2021

Related U.S. Application Data

(63) Continuation of application No. 15/676,207, filed on Aug. 14, 2017, now abandoned.

(30) Foreign Application Priority Data

Sep. 2, 2016 (JP) .................................. 2016-172268

(51) Int. Cl.
*H01M 8/1004* (2016.01)
*H01M 8/0258* (2016.01)
(Continued)

(52) U.S. Cl.
CPC ....... *H01M 8/1004* (2013.01); *H01M 8/0258* (2013.01); *H01M 8/026* (2013.01);
(Continued)

(58) Field of Classification Search
None
See application file for complete search history.

(56) References Cited

U.S. PATENT DOCUMENTS

| 6,296,964 B1 | 10/2001 | Ren et al. |
| 6,447,941 B1 | 9/2002 | Tomimatsu et al. |

(Continued)

FOREIGN PATENT DOCUMENTS

| CN | 1691369 A | 11/2005 |
| CN | 101467288 A | 6/2009 |

(Continued)

OTHER PUBLICATIONS

Abstract of JP 2006324084A. (Year: 2006).*
(Continued)

*Primary Examiner* — Gregg Cantelmo
(74) *Attorney, Agent, or Firm* — Hunton Andrews Kurth LLP

(57) ABSTRACT

A fuel cell is provided with: a membrane electrode assembly (MEA); and a cathode-side separator assembled to the MEA, the cathode-side separator including first passages on a first surface of the cathode-side separator on a side closer to the MEA, and second passages on a second surface of the cathode-side separator on an opposite side, the first and second passages allowing oxidant gas to flow through the first and second passages, respectively. The first passages include first recessed portions on the first surface so as to extend from one end of the cathode-side separator to the other end, the second passages include second recessed portions on the second surface so as to extend from the one end to the other end and to be arranged alternately with the first recessed portions, and a penetration hole on a bottom face of the second recessed portion penetrating through the cathode-side separator.

2 Claims, 17 Drawing Sheets

(51) Int. Cl.
  *H01M 8/026* (2016.01)
  *H01M 8/1007* (2016.01)
  *H01M 8/1053* (2016.01)
(52) U.S. Cl.
  CPC ........ *H01M 8/1007* (2016.02); *H01M 8/1053* (2013.01); *Y02E 60/50* (2013.01)

(56) References Cited

U.S. PATENT DOCUMENTS

| | | | |
|---|---|---|---|
| 7,056,608 | B2 | 6/2006 | Lloyd et al. |
| 2004/0112740 | A1* | 6/2004 | Shen .................. H01M 8/0263 |
| | | | 204/263 |
| 2005/0244689 | A1 | 11/2005 | Horiguchi et al. |
| 2008/0220311 | A1 | 9/2008 | Blank et al. |
| 2009/0197134 | A1 | 8/2009 | Blank |
| 2010/0323270 | A1 | 12/2010 | Shibata et al. |
| 2014/0154604 | A1 | 6/2014 | Brett et al. |
| 2016/0181625 | A1 | 6/2016 | Yang et al. |
| 2017/0194659 | A1 | 7/2017 | Jin et al. |
| 2018/0175405 | A1 | 6/2018 | Jo et al. |
| 2018/0233765 | A1 | 8/2018 | Brett et al. |

FOREIGN PATENT DOCUMENTS

| | | |
|---|---|---|
| CN | 101632190 A | 1/2010 |
| JP | S61216257 A | 9/1986 |
| JP | H07254424 A | 10/1995 |
| JP | 2004192994 A | 7/2004 |
| JP | 2005340179 A | 12/2005 |
| JP | 2006324084 A * | 11/2006 |
| JP | 2008027748 A | 2/2008 |

OTHER PUBLICATIONS

Meyer, Quentin, et al., "The Hydro-electro-thermal Performance of Air-cooled, Open-cathode Polymer Electrolyte Fuel Cells: Combined Localised Current Density, Temperature and Water Mapping", Electrochimica Acta, vol. 180 (2015), pp. 307-315.
Restriction Requirement, United States Patent and Trademark Office, issued to U.S. Appl. No. 15/676,207 on Oct. 8, 2019, 7 pages.
Non-Final Office Action, United States Patent and Trademark Office, issued to U.S. Appl. No. 15/676,207 on Mar. 9, 2020, 11 pages.
Final Office Action, United States Patent and Trademark Office, issued to U.S. Appl. No. 15/676,207 on Sep. 17, 2020, 14 pages.
Non-Final Office Action, United States Patent and Trademark Office, issued to U.S. Appl. No. 15/676,207 on May 6, 2021, 19 pages.

* cited by examiner

FUEL CELL AND FUEL CELL SEPARATOR

INCORPORATION BY REFERENCE

This is a continuation application of U.S. patent application Ser. No. 15/676,207, filed Aug. 14, 2017, now abandoned which claims the disclosure of Japanese Patent Application No. 2016-172268 filed on Sep. 2, 2016 including the specification, drawings and abstract is incorporated herein by reference in its entirety.

BACKGROUND

1. Technical Field

The present disclosure relates to a fuel cell and a fuel cell separator.

2. Description of Related Art

As a cooling method of a fuel cell, there has been known an air-cooling method using oxidant gas to be supplied for electric-power generation, other than a water-cooling method in which a coolant is circulated. As a separator used for an air-cooled fuel cell, there has been known a separator including a fuel flow passage provided on one surface so that fuel gas flows therethrough, an airflow passage provided on the other surface so that air flows therethrough, and a cooling airflow passage provided thereinside so as to be connected to the airflow passage via portions defining penetration holes (for example, Japanese Unexamined Patent Application Publication No. 2008-027748 (JP 2008-027748 A)). With the use of the separator, it is possible to send the air flowing through the cooling airflow passage into the airflow passage. Accordingly, it is possible to improve cooling efficiency and to restrain clogging of the airflow passage by condensed water. Further, in a fuel cell using a cathode-side separator including power generation passages on a surface on a membrane electrode assembly side, and cooling passages provided on a surface opposite to the membrane electrode assembly such that the power generation passages and the cooling passages are arranged alternately, it is well known that water is easily accumulated in a region below the cooling passages (for example, Quentin Meyer, and ten other people, "The Hydro-electro-thermal Performance of Air-cooled, Open-cathode Polymer Electrolyte Fuel Cells: Combined Localised Current Density, Temperature and Water Mapping" Electrochimica Acta, 2015, VOL. 180, p. 307-315).

SUMMARY

There is a fuel cell including a cathode-side separator including a first passage provided on a surface on a membrane electrode assembly side and constituted by first recessed portions, and a second passage provided on a surface opposite to the membrane electrode assembly across the first passage of the cathode side separator and constituted by second recessed portions arranged alternately with the first recessed portions. In such a fuel cell, oxidant gas flowing through the first passage may be hardly supplied to a region positioned below the second passage in the membrane electrode assembly, and water generated in the region may be hardly discharged to the first passage. Because of this, power generation performance may decrease.

The present disclosure provides a fuel cell and a fuel cell separator each of which restrains a decrease in power generation performance.

A first aspect of the present disclosure relates to a fuel cell including: a membrane electrode assembly; and a cathode-side separator assembled to the membrane electrode assembly, the cathode-side separator including first passages provided on a first surface of the cathode-side separator on a side closer to the membrane electrode assembly, the first passages allowing oxidant gas to flow through the first passages, and second passages provided on a second surface of the cathode-side separator on a side opposite to the membrane electrode assembly across the first surface of the cathode-side separator, the second passages allowing oxidant gas to flow through the second passages. Here, the first passages include first recessed portions provided on the first surface so as to extend from one end of the cathode-side separator to the other end, the second passages include second recessed portions provided on the second surface so as to extend from the one end of the cathode-side separator to the other end and to be arranged alternately with the first recessed portions, and a portion defining a penetration hole penetrating through the cathode-side separator is provided on a bottom face of the second recessed portion constituting the second passage.

In the above aspect, when a central side region indicates two regions positioned on a central side and end side regions indicate two regions positioned on end sides at a time when the bottom face of the second recessed portion constituting the second passage is equally divided into four regions in a width direction of the second passage so that each of the four regions has a width of ¼ of a width of the second passage, a total area of the portion defining the penetration hole, provided in the central side region, may be larger than a total area of the portion defining the penetration hole, provided in the two end side regions.

In the above aspect, when a central side region indicates two regions positioned on a central side and end side regions indicate two regions positioned on end sides at a time when the bottom face of the second recessed portion constituting the second passage is equally divided into four regions in a width direction of the second passage so that each of the four regions has a width of ¼ of a width of the second passage, the portion defining the penetration hole may be provided only in the central side region.

In the above aspect, when an upstream region indicates a region positioned on an upstream side of a flow of the oxidant gas and a downstream region indicates a region positioned on a downstream side at a time when the bottom face of the second recessed portion constituting the second passage is equally divided into two regions in a lengthwise direction of the second passage so that each of the two regions has a length of ½ of a length of the second passage, a total area of the portion defining the penetration hole, provided in the downstream region, may be smaller than a total area of the portion defining the penetration hole, provided in the upstream region.

In the above aspect, portions defining a plurality of penetration holes may be provided, and at least one of intervals between the portions defining the penetration holes, provided in the downstream region, may be larger than intervals between the portions defining the penetration holes, provided in the upstream region.

In the above aspect, portions defining a plurality of penetration holes may be provided, and at least one of areas of the portions defining the penetration holes, provided in the downstream region, may be smaller than each of areas of the portions defining the penetration holes, provided in the upstream region.

In the above aspect, when an upstream region indicates a region positioned on an upstream side of a flow of the oxidant gas and a downstream region indicates a region positioned on a downstream side at a time when the bottom face of the second recessed portion constituting the second passage is equally divided into two regions in a lengthwise direction of the second passage so that each of the two regions has a length of ½ of a length of the second passage, the portion defining the penetration hole may be provided only in the upstream region.

In the above aspect, a wall portion projecting inwardly in the second passage from the bottom face of the second recessed portion constituting the second passage may be provided in an upstream edge among edges of the portion defining the penetration hole, the upstream edge being positioned on an upstream side of a flow of the oxidant gas.

In the above aspect, portions defining a plurality of penetration holes may be provided, and the portion defining the penetration hole and provided with the wall portion may be provided on a downstream side of the second passage relative to the portion defining the penetration hole and not provided with the wall portion.

In the above aspect, portions defining a plurality of penetration holes may be provided, and heights of the wall portions provided in the portions defining the plurality of penetration holes may be set such that the height of the wall portion on a downstream side of the second passage is higher than the height of the wall portion on the upstream side of the second passage.

In the above aspect, the wall portion may be provided in the upstream edge among the edges of the portion defining the penetration hole, and in a lateral edge among the edges of the portion defining the penetration hole, the lateral edge being along the flow of the oxidant gas.

In the above aspect, a part where the portion defining the penetration hole is provided on the bottom face of the second recessed portion may project more than the other part of the bottom face of the second recessed portion.

In the above aspect, a width of a part of the second passage in which the portion defining the penetration hole is provided may be wider than a width of a part of the second passage in which the portion defining the penetration hole is not provided.

A second aspect of the present disclosure relates to a fuel cell separator to be assembled to a membrane electrode assembly, the fuel cell separator including: first recessed portions provided on one surface so as to extend from one end of the fuel cell separator to the other end; and second recessed portions provided on the other surface so as to extend from the one end of the fuel cell separator to the other end and to be arranged alternately with the first recessed portions, the second recessed portions each having a bottom face provided with a portion defining a penetration hole penetrating through the fuel cell separator.

According to the first and second aspects of the present disclosure, it is possible to restrain a decrease in power generation performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to the drawings, the following describes examples of the present disclosure.

Figure 1:
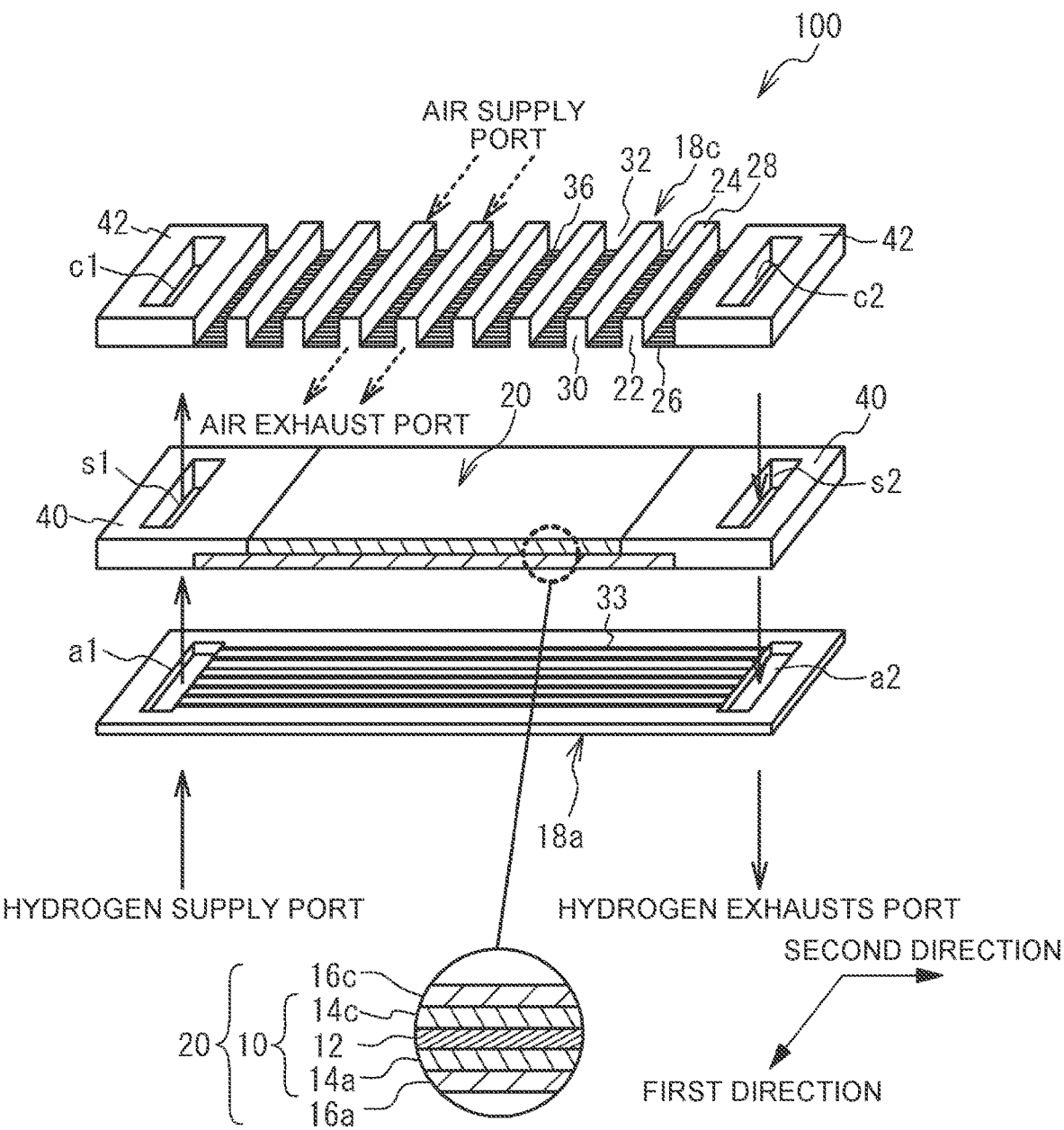
FIG. 1 is an exploded perspective view of a single cell constituting a fuel cell of Example 1.
Figure 2:
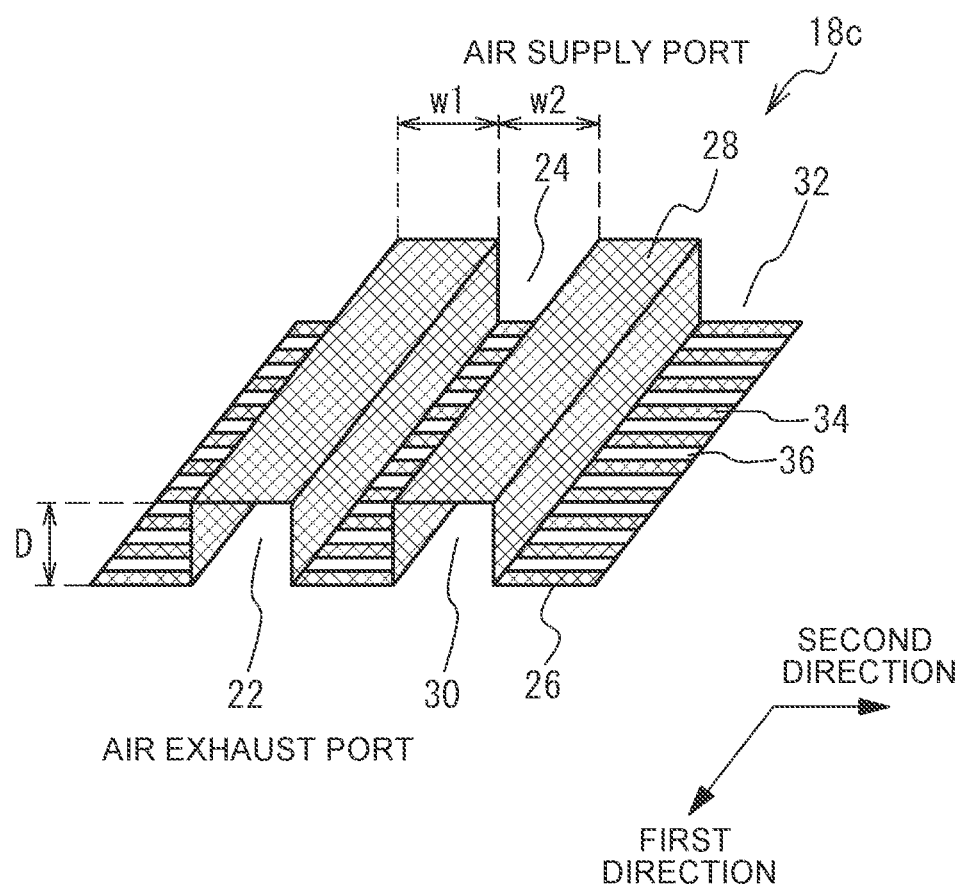
FIG. 2 is a perspective view of a cathode-side separator provided in the fuel cell of Example 1.

A fuel cell of Example 1 is a solid polymer fuel cell that receives supply of fuel gas (for example, hydrogen) and oxidant gas (for example, air) as reactant gas and generates electric power, and has a stack structure in which a plurality of single cells is laminated. The fuel cell of Example 1 is provided in a fuel-cell vehicle, an electric vehicle, or the like, for example. FIG. 1 is an exploded perspective view of a single cell 100 constituting the fuel cell of Example 1. FIG. 2 is a perspective view of a cathode-side separator 18c provided in the fuel cell of Example 1. Note that, in FIG. 2, a part of the cathode-side separator 18c is illustrated in an enlarged manner, and the cathode-side separator 18c is indicated by a cross hatch (the same is applied to FIG. 3B, FIGS. 8A to 8D, FIGS. 13 to 14B).

As illustrated in FIG. 1, the single cell 100 constituting the fuel cell of Example 1 includes an anode-side separator 18a, a membrane electrode gas diffusion layer assembly (MEGA) 20, and the cathode-side separator 18c. The MEGA 20 is placed inside insulating members 40 made of resin (such as epoxy resin or phenolic resin). The MEGA 20 and the insulating members 40 are sandwiched between the anode-side separator 18a and the cathode-side separator 18c. In other words, the anode-side separator 18a and the cathode-side separator 18c are assembled to the MEGA 20 and the insulating members 40.

As illustrated in FIGS. 1 and 2, the cathode-side separator 18c is made of a member having a gas barrier property and an electronic conductivity. For example, the cathode-side separator 18c is made of a metal plate such as stainless steel having an irregular shape by bending by press molding or the like. First passages 22 and second passages 24 through which air flows are formed by the irregular shape in a thickness direction in the cathode-side separator 18c. The first passages 22 and the second passages 24 linearly extend from one end of the cathode-side separator 18c to the other end thereof in a first direction and are arranged alternately in a second direction intersecting with the first direction. The air flowing through the first passages 22 and the second passages 24 flows from an air supply port, which is one end side of the cathode-side separator 18c, toward an air exhaust port, which is the other end side thereof.

The first passages 22 include first recessed portions 30 provided on a first surface 26 of the cathode-side separator 18c on a side of the cathode-side separator 18c closer to a MEGA 20 so as to extend from the one end of the cathode-side separator 18c to the other end thereof. Accordingly, the air flowing through the first passages 22 is supplied to the MEGA 20 so as to be used for electric-power generation. The second passages 24 include second recessed portions 32 provided on a second surface 28 of the cathode-side separator 18c on an opposite side to the side of the cathode-side separator 18c closer to the MEGA 20 so as to extend from the one end of the cathode-side separator 18c to the other end thereof and to be arranged alternately with the first recessed portions 30. Accordingly, the air flowing through the second passages 24 is mainly used for cooling the single cell 100. Thus, the fuel cell of Example 1 is an air-cooled fuel cell. Since the first passages 22 and the second passages 24 are arranged alternately in the second direction, the second passages 24 can be placed near the MEGA 20, thereby making it possible to improve cooling efficiency.

The first passage 22 and the second passage 24 have a generally uniform depth D from the air supply port to the air exhaust port. Further, a width W1 of the first passage 22 and a width W2 of the second passage 24 are generally uniform from the air supply port to the air exhaust port. Further, a pitch interval (a center-to-center distance) between the first passages 22 and a pitch interval (a center-to-center distance) between the second passages 24 are generally uniform from the air supply port to the air exhaust port.

On a bottom face 34 of the second recessed portion 32 constituting the second passage 24 (that is, a surface of the second passage 24 on the side closer to the MEGA 20), portions defining a plurality of penetration holes 36 penetrating through the cathode-side separator 18c are provided. The portions defining the penetration holes 36 have a rectangular shape extending from one end side of the second passage 24 to the other end side thereof in a width direction. The portions defining the penetration holes 36 are provided dispersedly at regular intervals in the first direction. The air flowing through the second passage 24 is partially supplied to the MEGA 20 via the portions defining the penetration holes 36. Accordingly, most of the air flowing through the second passages 24 is used for cooling the single cell 100, but the air is partially supplied to the MEGA 20 so as to be used for electric-power generation.

As illustrated in FIG. 1, the anode-side separator 18a is made of a member having a gas barrier property and an electronic conductivity, and is made of a carbon member such as dense carbon obtained by compressing carbon so that gas cannot pass therethrough, or a metal member such as stainless steel, for example. The anode-side separator 18a is provided with portions defining holes a1, a2, the insulating members 40 are provided with portions defining holes s1, s2, and insulating members 42 provided on both sides of the cathode-side separator 18c are provided with portions defining holes c1, c2. The portions defining the holes a1, s1, c1 communicate with each other, so as to define a supply manifold configured to supply hydrogen. The portions defining the holes a2, s2, c2 communicate with each other, so as to define a discharge manifold configured to discharge hydrogen. Hydrogen passages 33 through which hydrogen to be supplied to the MEGA 20 flows are provided on a surface of the anode-side separator 18a on the side closer to the MEGA 20, such that the hydrogen passages 33 linearly extend toward the discharge manifold from the supply manifold. The hydrogen passages 33 intersect with (e.g., perpendicularly to) the first passages 22 and the second passages 24.

The MEGA 20 includes an electrolyte membrane 12, an anode catalyst layer 14a, a cathode catalyst layer 14c, an anode gas diffusion layer 16a, and a cathode gas diffusion layer 16c. The anode catalyst layer 14a is provided on one surface of the electrolyte membrane 12, and the cathode catalyst layer 14c is provided on the other surface. Hereby, a membrane electrode assembly (MEA) 10 is formed. The electrolyte membrane 12 is a polymer electrolyte made of a fluorinated resin material having a sulfonic group or a hydrocarbon resin material, and exhibits an excellent proton conductivity in a wet state. The anode catalyst layer 14a and the cathode catalyst layer 14c include carbon particulates (e.g., carbon black) carrying a catalyst (e.g., platinum and platinum-cobalt alloy) that promotes an electrochemical reaction, and an ionomer that is a solid polymer having a sulfonic group and exhibits an excellent proton conductivity in a wet state.

The anode gas diffusion layer 16a and the cathode gas diffusion layer 16c are placed on both sides of the MEA 10. The anode gas diffusion layer 16a and the cathode gas diffusion layer 16c are formed by members having a gas permeability and an electronic conductivity, and are made of carbon porous members such as carbon cloth or carbon paper. Note that a water repellent layer for the purpose of adjusting a water content included in the MEA 10 may be provided between the MEA 10 and the anode gas diffusion layer 16a and between the MEA 10 and the cathode gas diffusion layer 16c. The water-repellent layer is made of a member having a gas permeability and an electronic conductivity, similarly to the anode gas diffusion layer 16a and the cathode gas diffusion layer 16c, and is made of a carbon porous member such as carbon cloth or carbon paper, for example. Note that the carbon porous member for the water repellent layer has small pores as compared with the anode gas diffusion layer 16a and the cathode gas diffusion layer 16c.

Figure 3A:
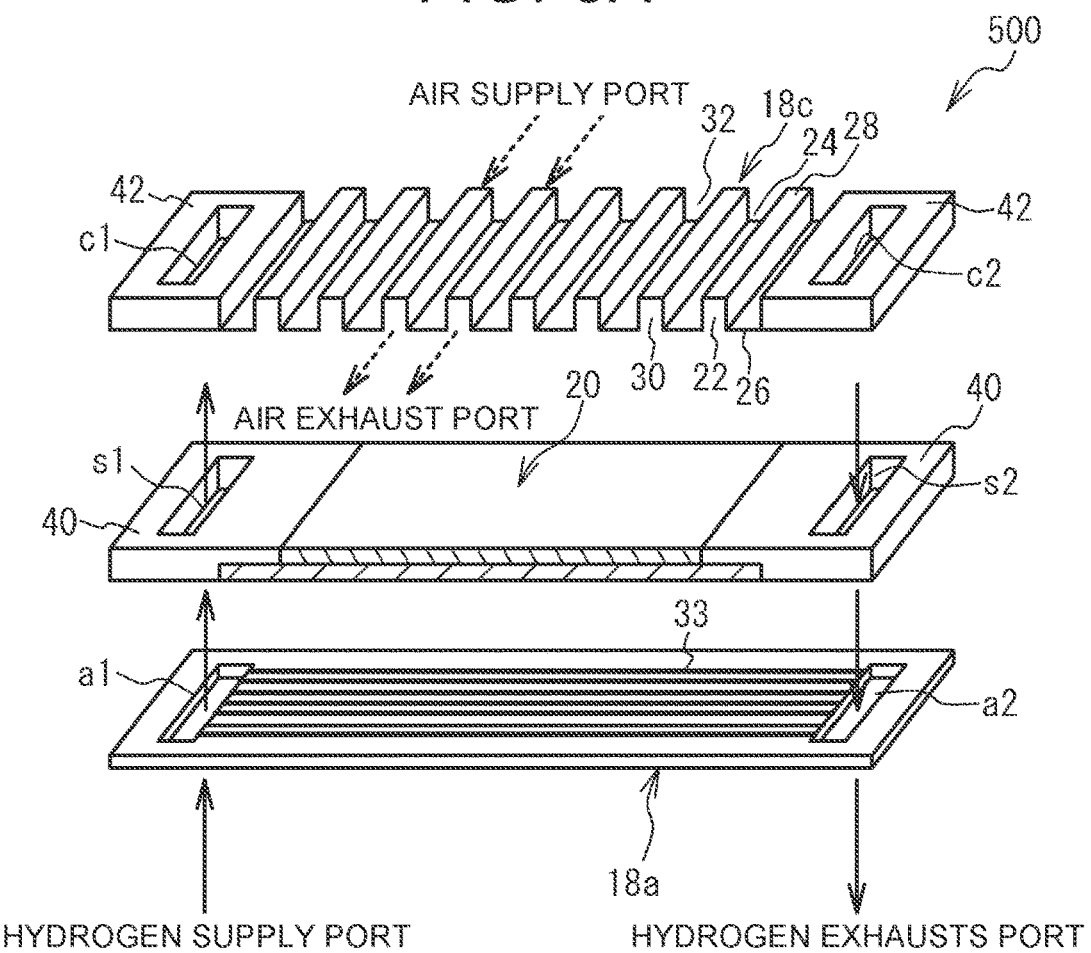
FIG. 3A is an exploded perspective view of a single cell constituting a fuel cell of Comparative Example 1.
Figure 3B:
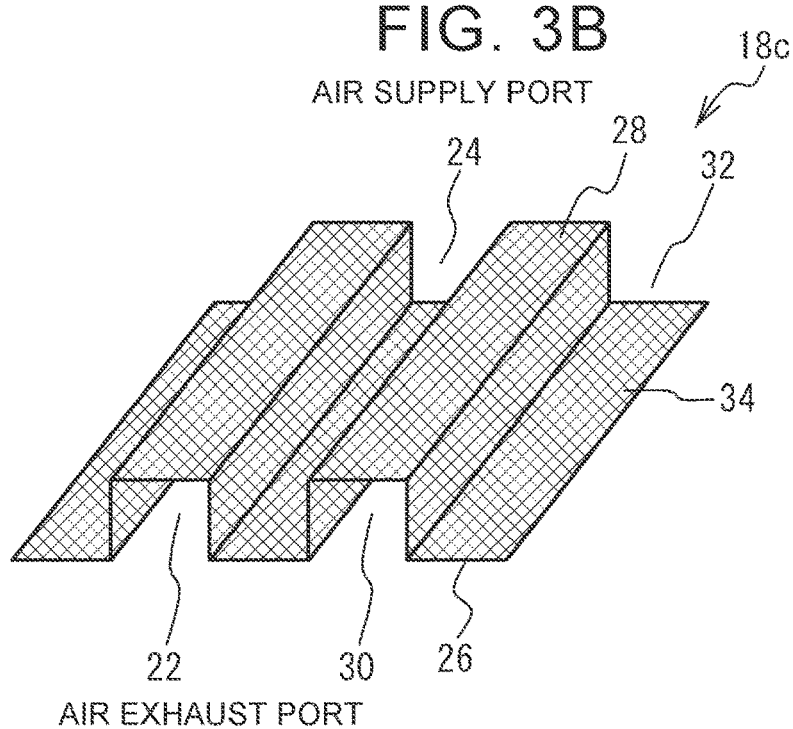
FIG. 3B is a perspective view of a cathode-side separator provided in the fuel cell of Comparative Example 1.

Here, in order to describe an effect of the fuel cell of Example 1, the following describes a fuel cell of Comparative Example 1. FIG. 3A is an exploded perspective view of a single cell 500 constituting the fuel cell of Comparative Example 1, and FIG. 3B is a perspective view of a cathode-side separator 18c provided in the fuel cell of Comparative Example 1. As illustrated in FIGS. 3A and 3B, the single cell 500 constituting the fuel cell of Comparative Example 1 does not include portions defining penetration holes on a bottom face 34 of a second recessed portion 32 constituting a second passage 24 of the cathode-side separator 18c. The other configurations are the same as those in Example 1, so descriptions thereof are omitted.

In the air-cooled fuel cell, the air flowing through the first passages 22 and the second passages 24 of the cathode-side separator 18c is supplied by a fan, vehicle speed wind, and the like. On this account, a pressure loss of the air flowing through the first passages 22 and the second passages 24 may be small, and for this purpose, sectional areas of the first passages 22 and the second passages 24 may be large. In order to increase the sectional areas of the first passages 22 and the second passages 24, it is conceivable that widths of the first passages 22 and the second passages 24 are widened. In view of this, by use of the fuel cell of Comparative Example 1, power generation performance at the time when the first passages 22 and the second passages 24 had a wide width was examined.

Figure 4:
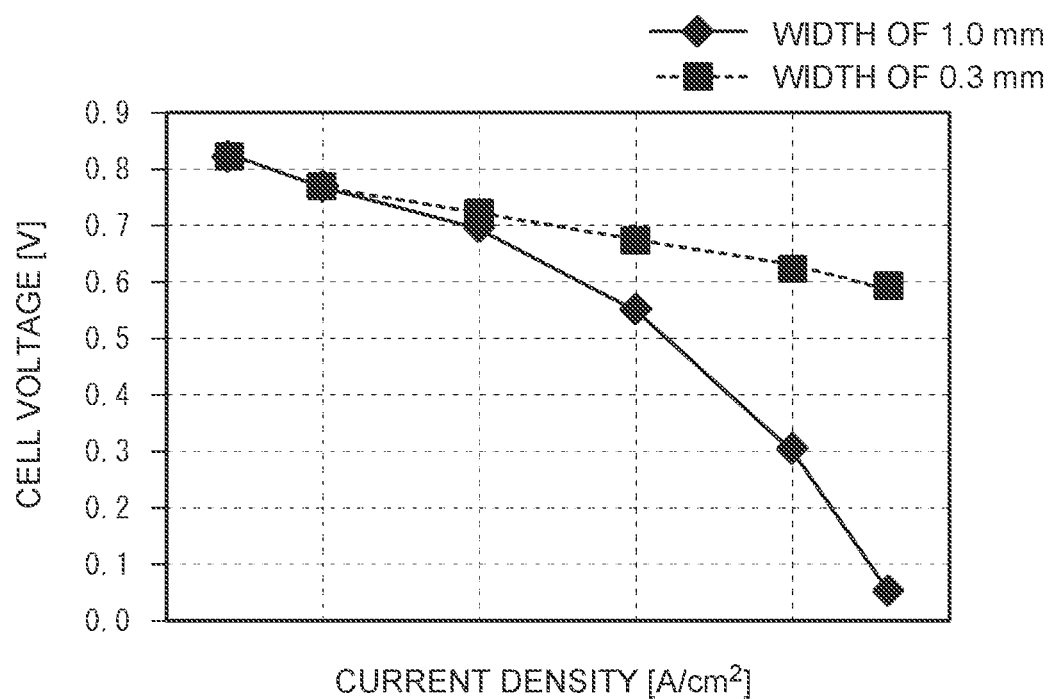
FIG. 4 is a view illustrating measurement results of current-voltage characteristics of the fuel cell of Comparative Example 1.

FIG. 4 is a view illustrating measurement results of current-voltage characteristics of the fuel cell of Comparative Example 1. In FIG. 4, a horizontal axis indicates a current density (A/cm$^2$) and a vertical axis indicates a cell voltage (V). A square mark in FIG. 4 indicates a measurement result at the time when a width W1 of the first passages 22 and a width W2 of the second passages 24 were 0.3 mm, and a diamond mark indicates a measurement result at the time when the width W1 of the first passages 22 and the width W2 of the second passages 24 were 1.0 mm. Note that the measurement was performed such that a temperature of the fuel cell was adjusted to 50° C., hydrogen humidified to a dew point temperature of 50° C. was supplied to hydrogen passages 33 of an anode-side separator 18a, and dry air with a gas temperature of 50° C. and a dew point temperature of −40° C. was supplied to the first passages 22 and the second passages 24 of the cathode-side separator 18c. As illustrated in FIG. 4, in a case where the widths of the first passages 22 and the second passages 24 were 1.0 mm, the power generation performance decreased as compared with a case where the widths of the first passages 22 and the second passages 24 were 0.3 mm.

Figure 5:
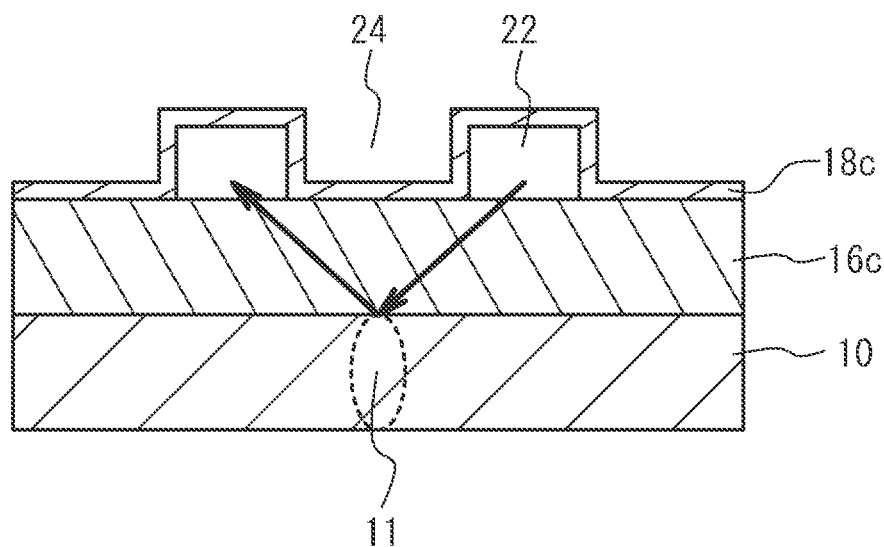
FIG. 5 is a sectional view to describe a reason why power generation performance decreases.

The reason why the power generation performance decreased when the widths of the first passages 22 and the second passages 24 were wider than 0.3 mm is presumably as follows. FIG. 5 is a sectional view to describe the reason why the power generation performance decreased. As illustrated in FIG. 5, the air flowing through the first passages 22 diffuses in the MEA 10, and water generated in the MEA 10 by an electrochemical reaction is discharged to the first passages 22. When the widths of the first passages 22 and the second passages 24 are widened, a distance between the first passage 22 and a region 11, in the MEA 10, positioned below the second passage 24 on a central side in the width direction of the second passage 24 becomes long. This makes it difficult to supply the air flowing through the first passage 22 to the region 11 of the MEA 10 and also makes it difficult for water generated in the region 11 of the MEA 10 to be discharged to the first passage 22. For this reason, it is considered that the power generation performance decreased because the first passages 22 and the second passages 24 were widened.

Note that, when the first passages 22 and the second passages 24 are deepened, it is possible to increase sectional areas of the first passages 22 and the second passages 24. However, when the first passages 22 and the second passages 24 are deepened, a pitch interval between adjacent single cells becomes wide, which upsizes the fuel cell. Accordingly, the sectional areas of the first passages 22 and the second passages 24 may not be increased by deepening the first passage 22 and the second passage 24, but the sectional areas of the first passages 22 and the second passages 24 may be increased by widening the widths of the first passages 22 and the second passages 24.

Next will be described a measurement performed on the fuel cell of Example 1. Note that, for a comparison, the same measurement was also performed on the fuel cell of Comparative Example 1. The fuel cells of Example 1 and Comparative Example 1 on which the measurement was performed have the same structure except that their cathode-side separators 18c have different shapes. The cathode-side separators 18c of Example 1 and Comparative Example 1 were both configured such that the width W1 of the first passages 22 was 1.0 mm, the width W2 of the second passages 24 was 1.0 mm, and the depths D of the first passages 22 and the second passages 24 were 1.0 mm. Further, in Example 1, portions defining penetration holes 36 having a rectangular shape of 0.5 mm×1.0 mm were provided at a pitch interval (a center-to-center distance) of 1.4 mm in the first direction on the bottom face 34 of the second recessed portion 32 constituting the second passage 24, but in Comparative Example 1, no portion defining a penetration hole was not provided.

Figure 6:
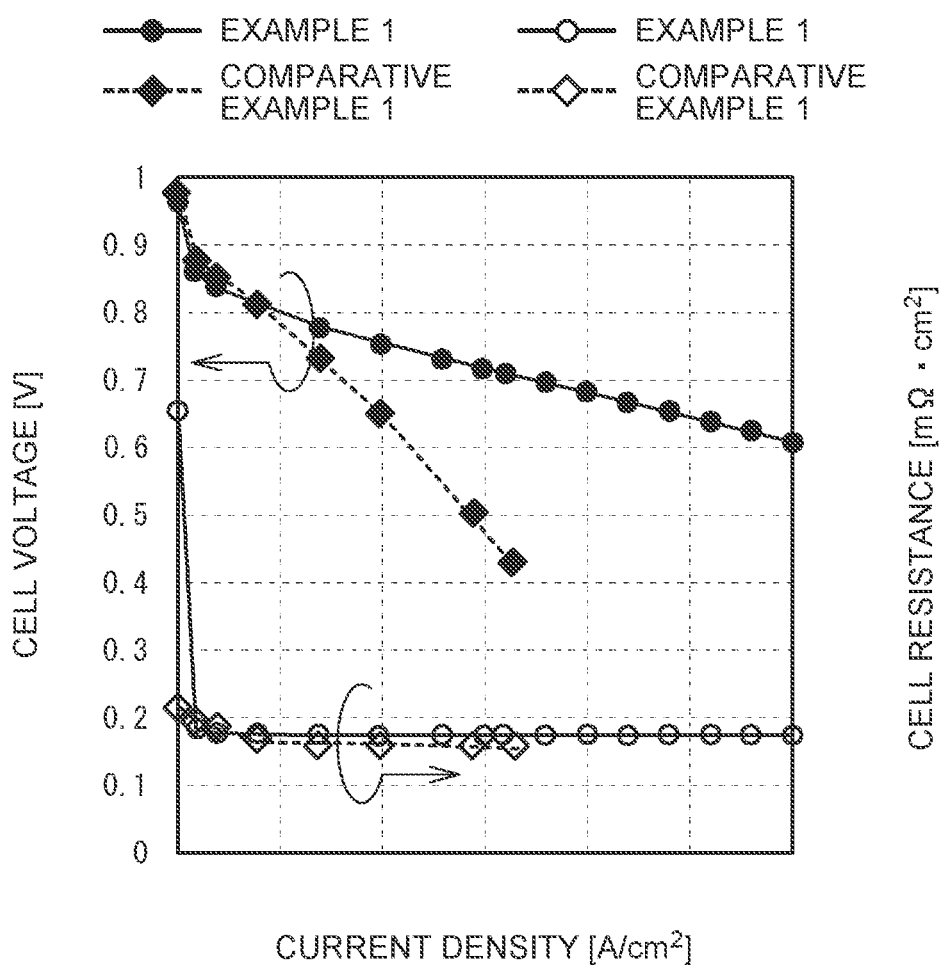
FIG. 6 is a view illustrating measurement results of current-voltage characteristics of the fuel cells of Example 1 and Comparative Example 1 under a high humidity condition.

FIG. 6 is a view illustrating measurement results of current-voltage characteristics of the fuel cells of Example 1 and Comparative Example 1 under a high humidity condition. In FIG. 6, a horizontal axis indicates a current density (A/cm$^2$), a left vertical axis indicates a cell voltage (V), and a right vertical axis indicates a cell resistance (mΩ·cm$^2$). A continuous line in FIG. 6 indicates the measurement result of Example 1, and a broken line indicates the measurement result of Comparative Example 1. Further, a black circle and a black diamond indicate measurement results of a cell voltage, and a white circle and a white diamond are measurement results of a cell resistance. Note that the measurement was performed such that a temperature of the fuel cell was adjusted to 50° C., hydrogen humidified to a dew point temperature of 50° C. and having a stoichiometry (a stoichiometric ratio) of 2 was supplied to the hydrogen passages 33 of the anode-side separator 18a, and the air humidified to a dew point temperature of 50° C. and having a constant flow of 40 L/min was supplied to the first passages 22 and the second passages 24 of the cathode-side separator 18c. That is, current-voltage characteristics in an operation under a high humidity condition were measured. Note that the stoichiometry is a ratio of a reactant gas amount actually supplied relative to a reactant gas amount necessary for a requested power generation amount.

As illustrated in FIG. 6, as compared with Comparative Example 1, Example 1 exhibited such a result that the cell voltage at a high current density was increased and the power generation performance was improved. The reason why the power generation performance was improved in the fuel cell of Example 1 is presumably as follows. That is, in the fuel cell of Example 1, the portions defining the penetration holes 36 are provided on the bottom face 34 of the second recessed portion 32 constituting the second passage 24. On this account, water generated in the region, of the MEA 10, positioned below the second passage 24 is easily discharged to the second passage 24 through the portions defining the penetration holes 36, so that the occurrence of flooding is restrained. Further, the air flowing through the second passage 24 is supplied to the MEA 10 via the portions defining the penetration holes 36, so that the occurrence of concentration overvoltage is restrained. It is considered that the power generation performance was improved in Example 1 for those reasons. Note that Example 1 had a cell resistance equivalent to that of Comparative Example 1. Accordingly, it is found that, even if the portions defining the penetration holes 36 are provided, a dry condition of the MEA 10 does not change in the operation under the high humidity condition, and further, a continuity condition between the cathode-side separator 18c and the MEGA 20 does not change, either.

Figure 7:
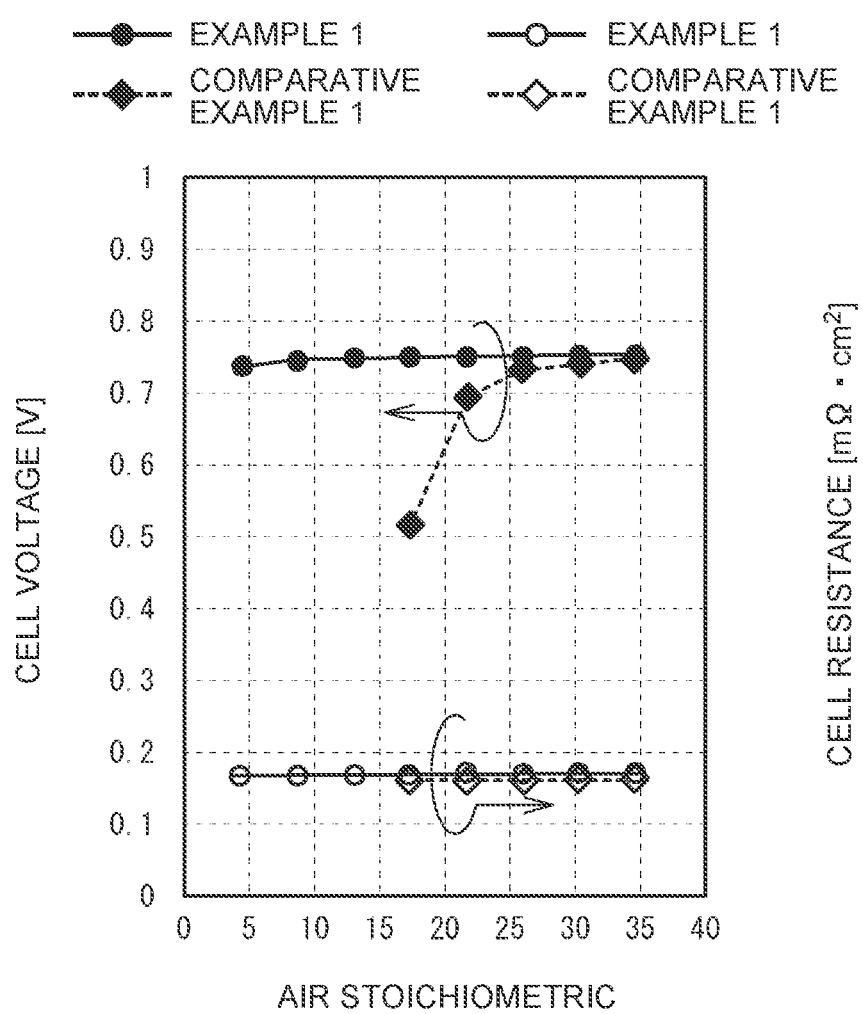
FIG. 7 is a view illustrating measurement results of air stoichiometric characteristics of the fuel cells of Example 1 and Comparative Example 1.

FIG. 7 is a view illustrating measurement results of air stoichiometric characteristics of the fuel cells of Example 1 and Comparative Example 1. In FIG. 7, a horizontal axis indicates an air stoichiometry at a predetermined current density, a left vertical axis indicates a cell voltage (V), and a right vertical axis indicates a cell resistance (mΩ·cm²). A continuous line in FIG. 7 indicates the measurement result of Example 1, and a broken line indicates the measurement result of Comparative Example 1. Further, a black circle and a black diamond indicate measurement results of a cell voltage, and a white circle and a white diamond are measurement results of a cell resistance. Note that the measurement was performed such that a temperature of the fuel cell was adjusted to 50° C., hydrogen humidified to a dew point temperature of 50° C. and having a stoichiometry of 2 was supplied to the hydrogen passages 33 of the anode-side separator 18a, and the air humidified to a dew point temperature of 50° C. was supplied to the first passages 22 and the second passages 24 of the cathode-side separator 18c.

As illustrated in FIG. 7, Example 1 exhibited such a result that, even if the air stoichiometry was lower than Comparative Example 1, the cell voltage was maintained and the air stoichiometric characteristic was improved. The reason why the air stoichiometric characteristic of the fuel cell of Example 1 was improved as such is presumably as follows. That is, the portions defining the penetration holes 36 were provided in the second recessed portion 32 constituting the second passage 24, so water generated in the MEA 10 was easily discharged to the second passage 24 via the portions defining the penetration holes 36, and the air flowing through the second passage 24 was supplied to the MEA 10 via the portions defining the penetration holes 36.

As described above, in Example 1, the cathode-side separator 18c includes the first passages 22 including the first recessed portions 30 and provided on the first surface 26 on the side closer to the MEA 10, and also includes, on the second surface 28 on an opposite side of the MEA 10 across the first surface 26, the second passages 24 including the second recessed portions 32 arranged alternately with the first recessed portions 30. The portions defining the penetration holes 36 penetrating through the cathode-side separator 18c are provided on the bottom faces 34 of the second recessed portions 32 constituting the second passages 24. Hereby, water generated in the MEA 10 positioned below the second passages 24 is easily discharged to the second passages 24 via the portions defining the penetration holes 36, so that the occurrence of flooding can be restrained. Further, the air flowing through the second passages 24 is supplied to the MEA 10 below the second passages 24 via the portions defining the penetration holes 36, so that the occurrence of concentration overvoltage can be restrained. This accordingly makes it possible to restrain a decrease in the power generation performance.

Further, in Example 1, the cathode-side separator 18c is made of a metal plate having an irregular shape in which recessed portions and projection portions extending in the first direction are repeated alternately in the second direction. On this account, the cathode-side separator 18c can be made with a simple structure, thereby making it possible to improve productivity and to reduce a manufacturing cost. Note that the cathode-side separator 18c may be made of a carbon member such as dense carbon obtained by compressing carbon so that gas cannot pass therethrough, for example.

Figure 8A:
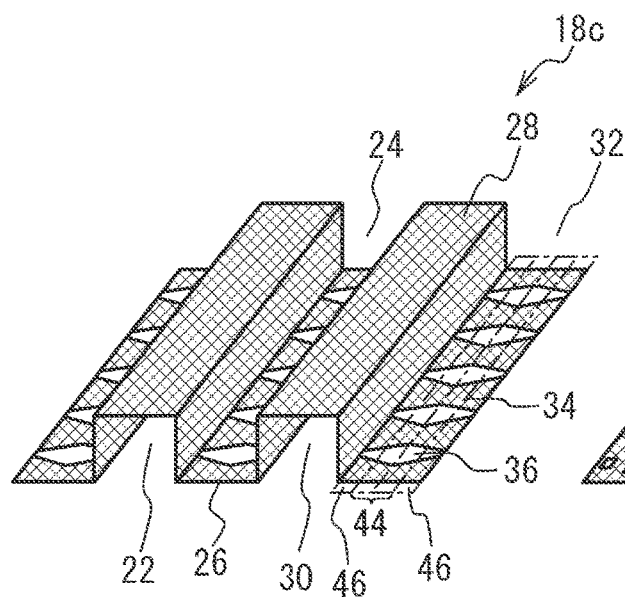
FIG. 8A is a perspective view of another example of the cathode-side separator in Example 1.

Note that Example 1 exemplifies a case where the portions defining the penetration holes 36 have a rectangular shape extending from one end side to the other end side in the width direction of the second passage 24, but the portions defining the penetration holes 36 are not limited to this case. FIGS. 8A to 8D are perspective views illustrating other examples of the cathode-side separator 18c in Example 1. As illustrated in FIG. 8A, the portion defining the penetration hole 36 may have a shape that changes in width from an end side of the second passage 24 in the width direction toward a central side thereof. For example, the portion defining the penetration hole 36 may have a shape that increases in width from the end side of the second passage 24 in the width direction toward the central side thereof. That is, the portion defining the penetration hole 36 may be configured such that an area in a central side region 44 on the central side of the second passage 24 in the width direction is larger than an area in end side regions 46 on the end side. Note that the central side region 44 indicates two regions positioned on the central side when the bottom face 34 of the second recessed portion 32 constituting the second passage 24 is equally divided into four regions in the width direction of the second passage 24 so that each of the four regions has a width of ¼ of the width of the second passage 24. The end side regions 46 indicate two regions positioned on the end sides when the bottom face 34 of the second recessed portion 32 constituting the second passage 24 is equally divided into four regions in the width direction of the second passage 24 so that each of the four regions has a width of ¼ of the width of the second passage 24.

Figure 8B:
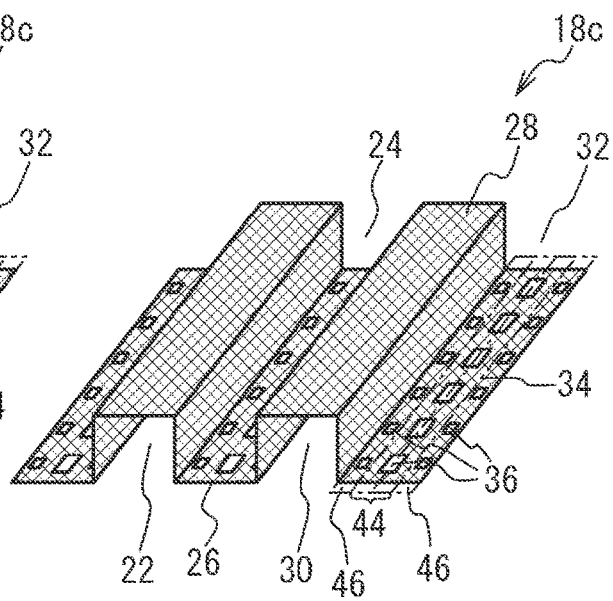
FIG. 8B is a perspective view of another example of the cathode-side separator in Example 1.

As illustrated in FIG. 8B, the portion defining the penetration hole 36 may not extend from the one end side to the other end side in the width direction of the second passage 24, but may be provided so as to be divided separately on the central side and the end sides in the width direction of the second passage 24. In this case, the portion defining the penetration hole 36, provided in the central side region 44 of the second passage 24, may have the same area as or a different area from an area of the portion defining the penetration hole 36, provided in the end side region 46 of the second passage 24. For example, the area of the portion defining the penetration hole 36, provided in the central side region 44 of the second passage 24, may be larger than the area of the portion defining the penetration hole 36, provided in the end side region 46 of the second passage 24.

Figure 8C:
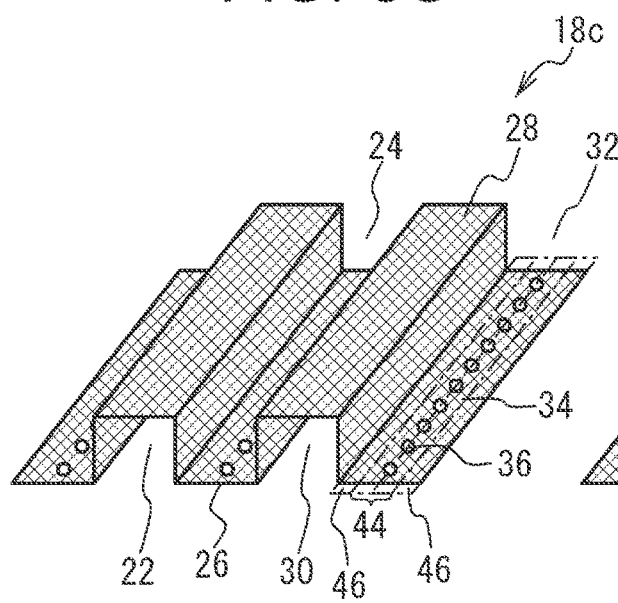
FIG. 8C is a perspective view of another example of the cathode-side separator in Example 1.
Figure 8D:
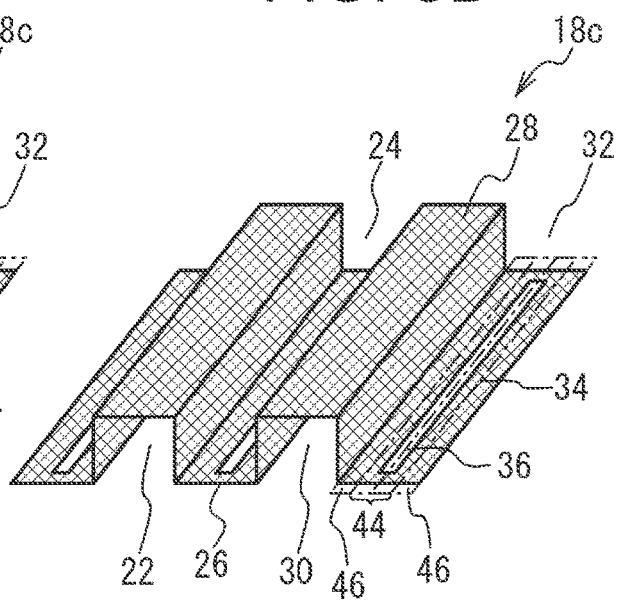
FIG. 8D is a perspective view of another example of the cathode-side separator in Example 1.

As illustrated in FIG. 8C, the portion defining the penetration hole 36 may have a circular shape or an oval shape. The portion defining the penetration hole 36 may be provided only in the central side region 44 of the second passage 24, and may not be provided in the end side regions 46. As illustrated in FIG. 8D, only one portion defining the penetration hole 36 may be provided.

As described above, the air can be hardly supplied from the first passage 22 to the region, of the MEA 10, positioned below the second passage 24 on the central side in the width direction of the second passage 24, and further, water generated in the region can be hardly discharged to the first passage 22. Accordingly, from the viewpoint of promoting the supply of the air to the region of the MEA 10 and promoting the discharge of water generated in the region, a portion defining a relatively large penetration hole 36 may be provided on the central side in the width direction of the second passage 24. In the meantime, when a ratio of the portion defining the penetration hole 36 and occupying the bottom face 34 of the second recessed portion 32 constituting the second passage 24 is too high, a contact area between the cathode-side separator 18c and the MEGA 20 becomes small, which increases a resistance to conduction between the cathode-side separator 18c and the MEGA 20. Accordingly, the portion defining the penetration hole 36 may be provided to such an extent that the resistance to conduction between the cathode-side separator 18c and the MEGA 20 does not increase.

From those points, as illustrated in FIGS. 8A to 8D, a total area of the portions defining the penetration holes 36, provided in the central side region 44 in the bottom face 34 of the second recessed portion 32 constituting the second passage 24 may be larger than a total area of the portions defining the penetration holes 36, provided in two end side regions 46. In other words, a central side aperture ratio, which is a ratio of the total area of the portions defining the penetration holes 36, provided in the central side region 44, with respect to a total area of the central side region 44 may be larger than an end side aperture ratio, which is a ratio of the total area of the portions defining the penetration holes 36, provided in the two end side regions 46, with respect to a total area of the two end side regions 46. As illustrated in FIGS. 8C and 8D, the portion defining the penetration hole 36 may be provided only in the central side region 44 among the central side region 44 and the end side regions 46.

Figure 9:
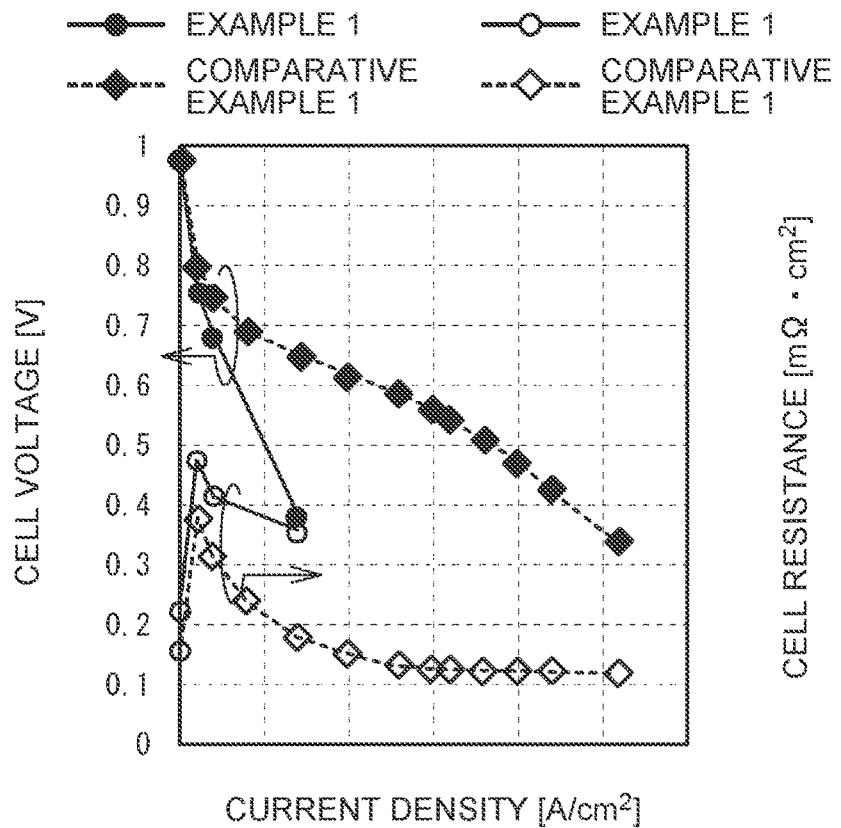
FIG. 9 is a view illustrating measurement results of current-voltage characteristics of the fuel cells of Example 1 and Comparative Example 1 under a low humidity condition.

First described are current-voltage characteristics at the time when the fuel cells of Example 1 and Comparative Example 1 are operated under a low humidity condition. The structures of the fuel cells of Example 1 and Comparative Example 1 on which the measurement of the current-voltage characteristic was performed are the same as the structures on which the measurements in FIGS. 6 and 7 were performed. FIG. 9 is a view illustrating measurement results of the current-voltage characteristics of the fuel cells of Example 1 and Comparative Example 1 under the low humidity condition. In FIG. 9, a horizontal axis indicates a current density (A/cm$^2$), a left vertical axis indicates a cell voltage (V), and a right vertical axis indicates a cell resistance (mΩ·cm$^2$). A continuous line in FIG. 9 indicates the measurement result of Example 1, and a broken line indicates the measurement result of Comparative Example 1. Further, a black circle and a black diamond indicate measurement results of a cell voltage, and a white circle and a white diamond are measurement results of a cell resistance. Note that the measurement was performed such that a temperature of the fuel cell was adjusted to 80° C., hydrogen humidified to a dew point temperature of 40° C. and having a stoichiometry of 2 was supplied to the hydrogen passages 33 of the anode-side separator 18a, and the air humidified to a dew point temperature of 27° C. and having a constant flow of 40 L/min was supplied to the first passages 22 and the second passages 24 of the cathode-side separator 18c.

As illustrated in FIG. 9, Example 1 exhibited such a result that the cell voltage at a high current density was lower than Comparative Example 1. The reason why the power generation performance of the fuel cell of Example 1 decreased in the operation under the low humidity condition as such will be described with reference to FIGS. 10 to 12.

Figure 10:
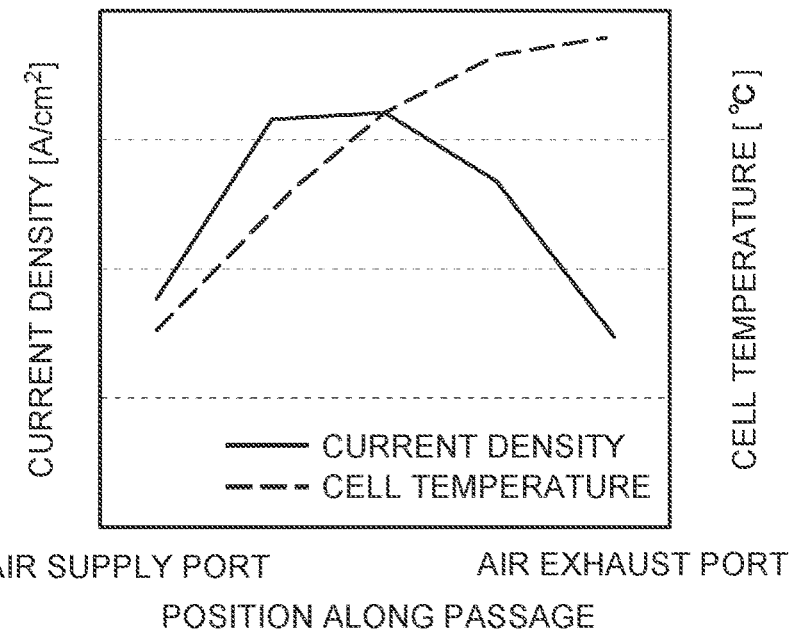
FIG. 10 is a view illustrating a power generation distribution and a temperature distribution of the fuel cell of Comparative Example 1.

FIG. 10 is a view illustrating a power generation distribution and a temperature distribution of the fuel cell of Comparative Example 1. In FIG. 10, a horizontal axis indicates a position along the first passages 22 and the second passages 24, a left vertical axis indicates a current density (A/cm$^2$), and a right vertical axis indicates a cell temperature (° C.). Note that FIG. 10 indicates a current density and a cell temperature of each part in a single cell when hydrogen humidified to a dew point temperature of 50° C. flows through the hydrogen passages 33, the air at a low humidification with a gas temperature of 25° C. and a dew point temperature of 10° C. is supplied to the first passages 22 and the second passages 24 from the air supply port, and an average current density of the single cell is 1.0 A/cm$^2$. As illustrated in FIG. 10, it is found that the cell temperature increases from the air supply port toward the air exhaust port. Further, it is found that the current densities on the air supply port side and the air exhaust port side are lower than the current density in a part therebetween.

Figure 11:
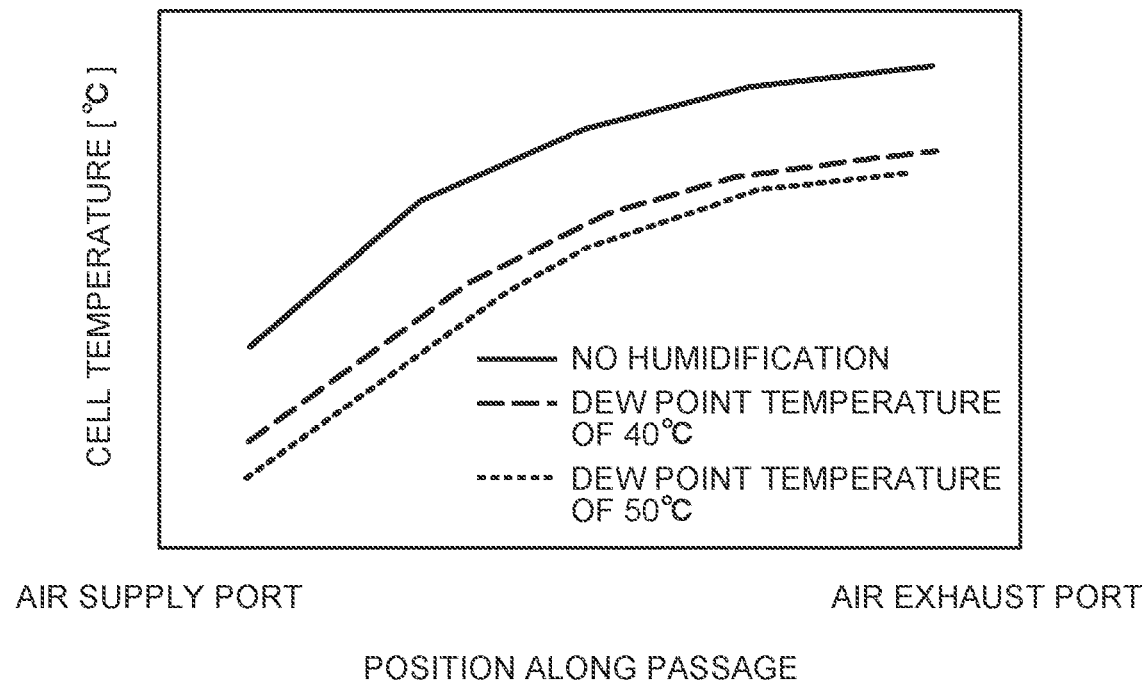
FIG. 11 is a view illustrating a temperature distribution of the fuel cell of Comparative Example 1 in a case where a humidity state of hydrogen is changed.

FIG. 11 is a view illustrating a temperature distribution of the fuel cell of Comparative Example 1 in a case where a humidity state of hydrogen is changed. In FIG. 11, a horizontal axis indicates a position along the first passages 22 and the second passages 24, and a vertical axis indicates a cell temperature (° C.). Note that FIG. 11 illustrates cell temperatures in the following cases at the time when a current density of the single cell is 1.0 A/cm$^2$: a case where hydrogen that is not humidified flows through the hydrogen passages 33; a case where hydrogen humidified to a dew point temperature of 40° C. flows therethrough; and a case where hydrogen humidified to a dew point temperature of 50° C. flows therethrough. A condition of the air flowing through the first passages 22 and the second passages 24 is a low humidity condition with a gas temperature of 25° C. and a dew point temperature of 10° C., and the condition is applied to all the cases. The case where hydrogen that is not humidified flows is indicated by a continuous line, the case where hydrogen humidified to a dew point temperature of 40° C. flows is indicated by a broken line, and the case where hydrogen humidified to a dew point temperature of 50° C. flows is indicated by a dotted line.

As illustrated in FIG. 11, even in a case where the humidifying state of hydrogen flowing through the hydrogen passages 33 is changed, it is found that the cell temperature eventually increases from the air supply port toward the air exhaust port. The reason why the cell temperature increases from the air supply port toward the air exhaust port is presumably as follows. That is, a temperature of the air flowing through the first passages 22 and the second passages 24 increases due to heat generation by an electrochemical reaction in the MEA 10. On this account, cooling performance decreases on the air exhaust port side in comparison with the air supply port side. This presumably increases the cell temperature from the air supply port toward the air exhaust port. Note that, in a case where the fuel cell is provided in a fuel-cell vehicle or an electric vehicle, a size of the fuel cell is restricted by a mounting space in the vehicle. On this account, in order to obtain a large electric-power generation, it is desired to lengthen a length of a power generation portion in a direction along the first passages 22 and the second passages 24. In this case, a temperature gradient along the first passages 22 and the second passages 24 increases, so that a cell temperature on the air exhaust port side becomes higher.

Figure 12:
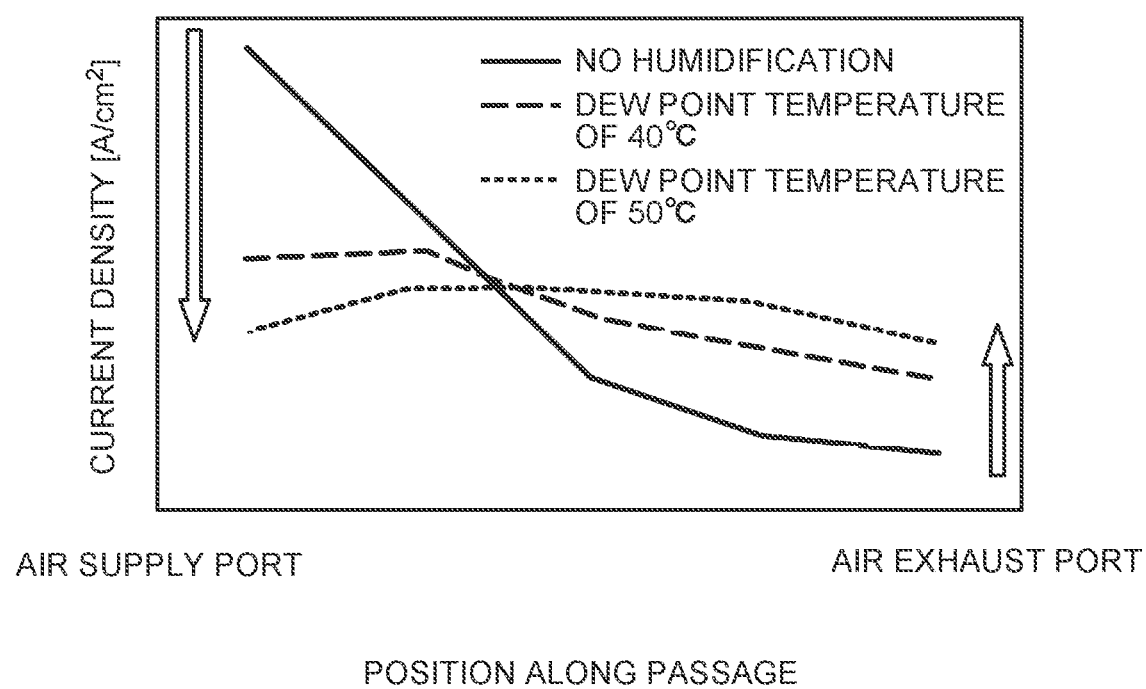
FIG. 12 is a view illustrating a power generation distribution of the fuel cell of Comparative Example 1 in a case where a humidity state of hydrogen is changed.

FIG. 12 is a view illustrating a power generation distribution of the fuel cell of Comparative Example 1 in a case where a humidity state of hydrogen is changed. In FIG. 12, a horizontal axis indicates a position along the first passages 22 and the second passages 24, and a vertical axis indicates a current density (A/cm$^2$). Also in FIG. 12, a case where hydrogen that is not humidified flows through the hydrogen passages 33 is indicated by a continuous line, a case where hydrogen humidified to a dew point temperature of 40° C. flows is indicated by a broken line, and a case where hydrogen humidified to a dew point temperature of 50° C. flows is indicated by a dotted line. A condition of the air flowing through the first passages 22 and the second passages 24 is a low humidity condition with a gas temperature of 25° C. and a dew point temperature of 10° C., and the condition is applied to all the cases.

As illustrated in FIG. 12, it is found that the current density decreases as a humidifying degree of hydrogen flowing through the hydrogen passages 33 increases on the air supply port side. The reason is presumably as follows. That is, on the air supply port side, a cooling effect of the air is high, so the cell temperature decreases. Because of this, a saturation vapor pressure of water decreases, so that the discharge of water generated by an electrochemical reaction in the MEA 10 is performed in a form of liquid water. That is, the air supply port side is in a state where liquid water is easily accumulated in the MEA 10. Accordingly, it is considered that, when humidified hydrogen is supplied to the hydrogen passages 33, flooding due to excessive liquid water in the MEA 10 occurs, thereby resulting in the decrease in the power generation performance. Note that, when the cell temperature decreases, an electrochemical reaction by the catalyst can hardly proceed, so that the power generation performance decreases. Since the power generation performance changes due to the change in the humidifying degree of hydrogen, it is considered that excessive liquid water in the MEA 10 causes the decrease in the power generation performance as mentioned earlier.

In the meantime, on the air exhaust port side, as the humidifying degree of hydrogen flowing through the hydrogen passages 33 increases, the current density increases. The reason is presumably as follows. That is, on the air exhaust port side, a cooling effect of the air decreases, so the cell temperature increases. This results in that the saturation vapor pressure of water increases, so that the discharge of water generated by the electrochemical reaction in the MEA 10 is immediately performed in a form of steam. That is, the air exhaust port side is in a state where liquid water can be hardly accumulated in the MEA 10, so that the MEA 10 is easily dried. Accordingly, when humidified hydrogen is supplied to the hydrogen passages 33, the drying of the MEA 10 is improved, thereby presumably resulting in that the power generation performance increases.

Note that, as illustrated in FIG. 3A, the first passages 22 and the second passages 24 intersect with (e.g., perpendicularly to) the hydrogen passages 33. On this account, the state of hydrogen flowing through the hydrogen passages 33 is the same on the air supply port side and on the air exhaust port side. Therefore, it is considered that the power generation distribution in the direction along the first passages 22 and the second passages 24 is caused by the air flowing through the first passages 22 and the second passages 24.

As such, on the air supply port side, the decrease in the power generation performance may be caused due to flooding by excessive liquid water including generated water. On the air exhaust port side, an increase in the resistance of the electrolyte membrane 12 due to the drying of the MEA 10 might cause the decrease in the power generation performance. In the fuel cell of Comparative Example 1, no portion defining a penetration hole is provided in the second passage 24. On the other hand, in the fuel cell of Example 1, the portion defining the penetration hole 36 is provided in the second passage 24. On this account, in Example 1, water generated in the MEA 10 is easily discharged outside in comparison with Comparative Example 1. This contributes to restraining the decrease in the power generation performance caused due to flooding on the air supply port side, but promotes the drying of the MEA 10 on the air exhaust port side, thereby causing a decrease in the power generation performance. Accordingly, the decrease in the power generation performance in Example 1 in comparison with Comparative Example 1 as illustrated in FIG. 9 is presumably caused by the drying of the MEA 10. Further, the cell resistance in Example 1 is higher than the cell resistance in Comparative Example 1 in FIG. 9. From this point, it is also considered that the power generation performance decreased due to the drying of the MEA 10.

Figure 13:
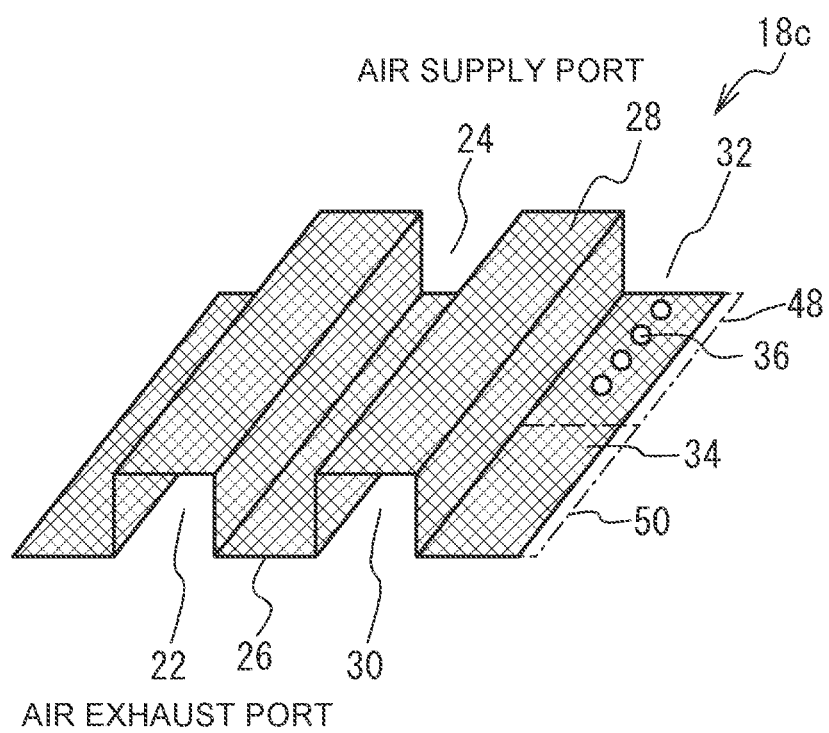
FIG. 13 is a perspective view of a cathode-side separator provided in a fuel cell of Example 2.

FIG. 13 is a perspective view of a cathode-side separator 18c provided in a fuel cell of Example 2. As illustrated in FIG. 13, in the cathode-side separator 18c provided in the fuel cell of Example 2, portions defining penetration holes 36 having a circular shape or an oval shape are provided only in an upstream region 48 placed on a central side in a width direction of a second passage 24 and on an upstream side relative to a flow of air flowing through the second passage 24, but are not provided in a downstream region 50 on a downstream side. Note that the upstream region 48 is a region positioned on the upstream side of the flow of the air when a bottom face 34 of a second recessed portion 32 constituting the second passage 24 is equally divided into two regions in a lengthwise direction of the second passage 24 so that each of the two regions has a length of ½ of a length of the second passage 24. The downstream region 50 is a region positioned on the downstream side of the flow of the air when the bottom face 34 of the second recessed portion 32 constituting the second passage 24 is equally divided into two regions in the lengthwise direction of the second passage 24 so that each of the two regions has a length of ½ of the length of the second passage 24. The other configurations of the fuel cell of Example 2 are the same as those in Example 1, so descriptions thereof are omitted.

In Example 2, the portions defining the penetration holes 36 are provided only in the upstream region 48 of the bottom face 34 of the second recessed portion 32 constituting the second passage 24. Hereby, on the upstream side of the second passage 24, the discharge of generated water and the supply of the air through the portions defining the penetration holes 36 are enabled, thereby making it possible to restrain the occurrence of flooding and concentration overvoltage. On the downstream side of the second passage 24, the portions defining the penetration holes 36 are not provided, so generated water can be hardly discharged, thereby making it possible to restrain drying of a MEA 10. Accordingly, with Example 2, even in a case of an operation under a low humidity condition, it is possible to restrain a decrease in power generation performance.

Figure 14A:
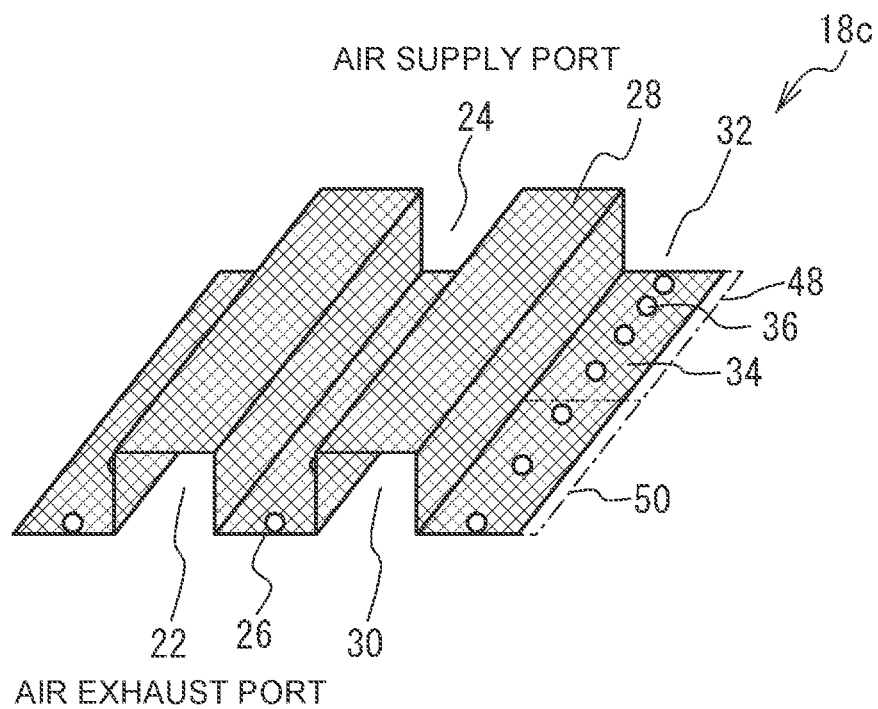
FIG. 14A is a perspective view of another example of the cathode-side separator provided in the fuel cell of Example 2.
Figure 14B:
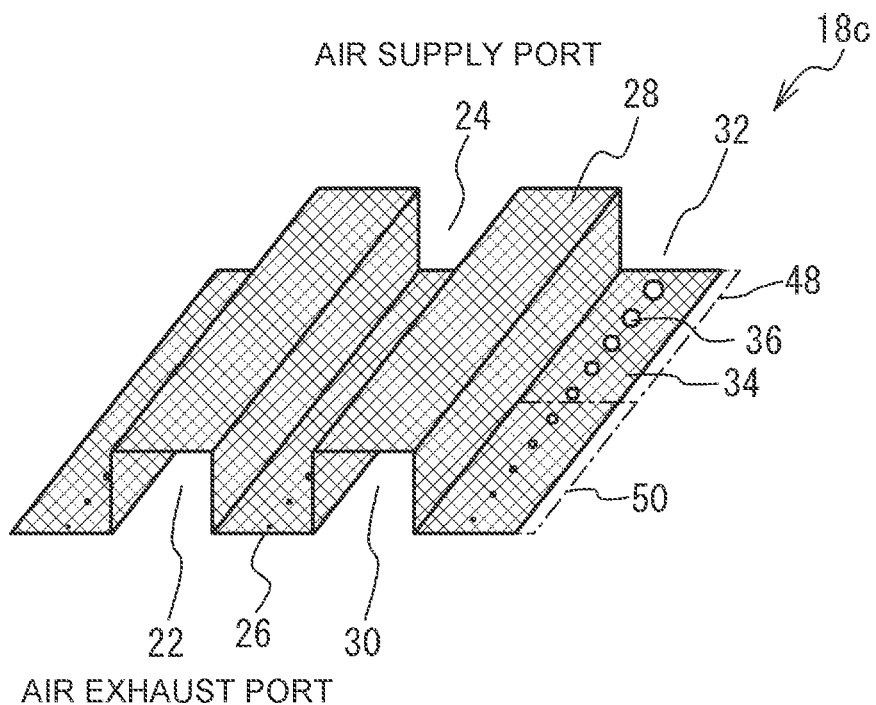
FIG. 14B is a perspective view of another example of the cathode-side separator provided in the fuel cell of Example 2.

FIGS. 14A and 14B are perspective views illustrating other examples of the cathode-side separator 18c provided in the fuel cell of Example 2. As illustrated in FIG. 14A, portions defining a plurality of penetration holes 36 having the same shape and the same size may be provided such that intervals therebetween are gradually widened from an air supply port of the second passage 24 toward an air exhaust port thereof. That is, intervals between the portions defining the penetration holes 36, provided in the downstream region 50 of the second passage 24, may be larger than intervals between the portions defining the penetration holes 36, provided in the upstream region 48 of the second passage 24. As illustrated in FIG. 14B, portions defining a plurality of penetration holes 36 configured such that their sizes are gradually decreased from the air supply port of the second passage 24 toward the air exhaust port thereof may be provided at regular intervals. That is, areas of the portions defining the penetration holes 36, provided in the downstream region 50 of the second passage 24, may be smaller than areas of the portions defining the penetration holes 36, provided in the upstream region 48 of the second passage 24. Even in those cases, the occurrence of flooding and concentration overvoltage can be restrained on the upstream side of the second passage 24, and generated water can be hardly discharged on the downstream side of the second passage 24, thereby making it possible to restrain the drying of the MEA 10. This accordingly makes it possible to restrain the decrease in the power generation performance.

Accordingly, from the viewpoint of restraining the decrease in the power generation performance in the operation under the low humidity condition, a total area of the portions defining the penetration holes 36, provided in the downstream region 50 of the bottom face 34 of the second recessed portion 32 constituting the second passage 24 may be smaller than a total area of the portions defining the penetration holes 36, provided in the upstream region 48, as illustrated in FIGS. 13 to 14B. In other words, a downstream aperture ratio, which is a ratio of the total area of the portions defining the penetration holes 36, provided in the downstream region 50, with respect to a total area of the downstream region 50 may be smaller than an upstream aperture ratio, which is a ratio of the total area of the portions defining the penetration holes 36, provided in the upstream region 48, with respect to a total area of the upstream region 48.

Note that, in the viewpoint of restraining the decrease in the power generation performance, all the intervals between the portions defining the penetration holes 36, provided in the downstream region 50 of the second passage 24, may be larger than the intervals between the portions defining the penetration holes 36, provided in the upstream region 48 of the second passage 24, as illustrated in FIG. 14A. However, at least one of the intervals between the portions defining the penetration holes 36, provided in the downstream region 50, may be larger than the intervals between the portions defining the penetration holes 36, provided in the upstream region 48. Similarly, as illustrated in FIG. 14B, all the areas of the portions defining the penetration holes 36, provided in the downstream region 50 of the second passage 24, may be smaller than the areas of the portions defining the penetration holes 36, provided in the upstream region 48 of the second passage 24. However, at least one of the areas of the portions defining the penetration holes 36, provided in the downstream region 50, may be smaller than the areas of the portions defining the penetration holes 36, provided in the upstream region 48.

Figure 15:
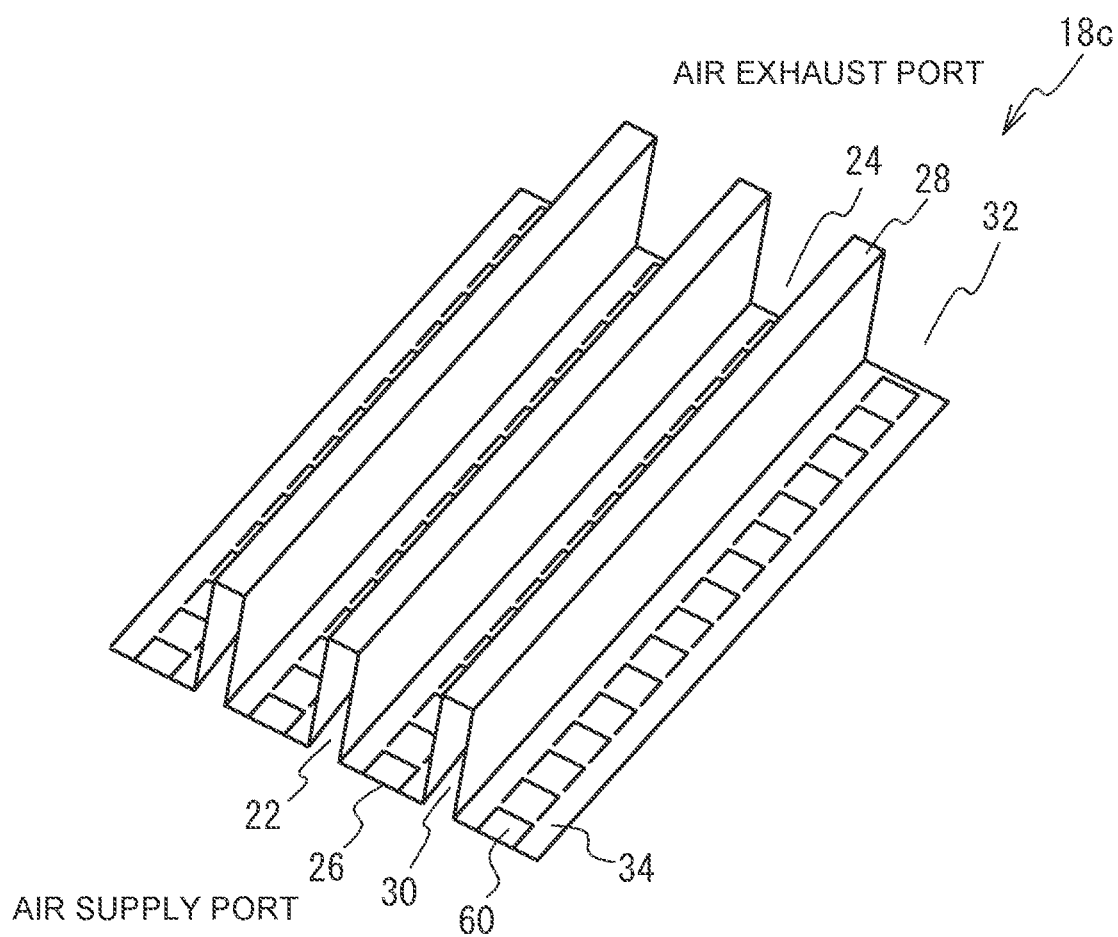
FIG. 15 is a perspective view (No. 1) of a cathode-side separator provided in a fuel cell of Example 3.
Figure 16:
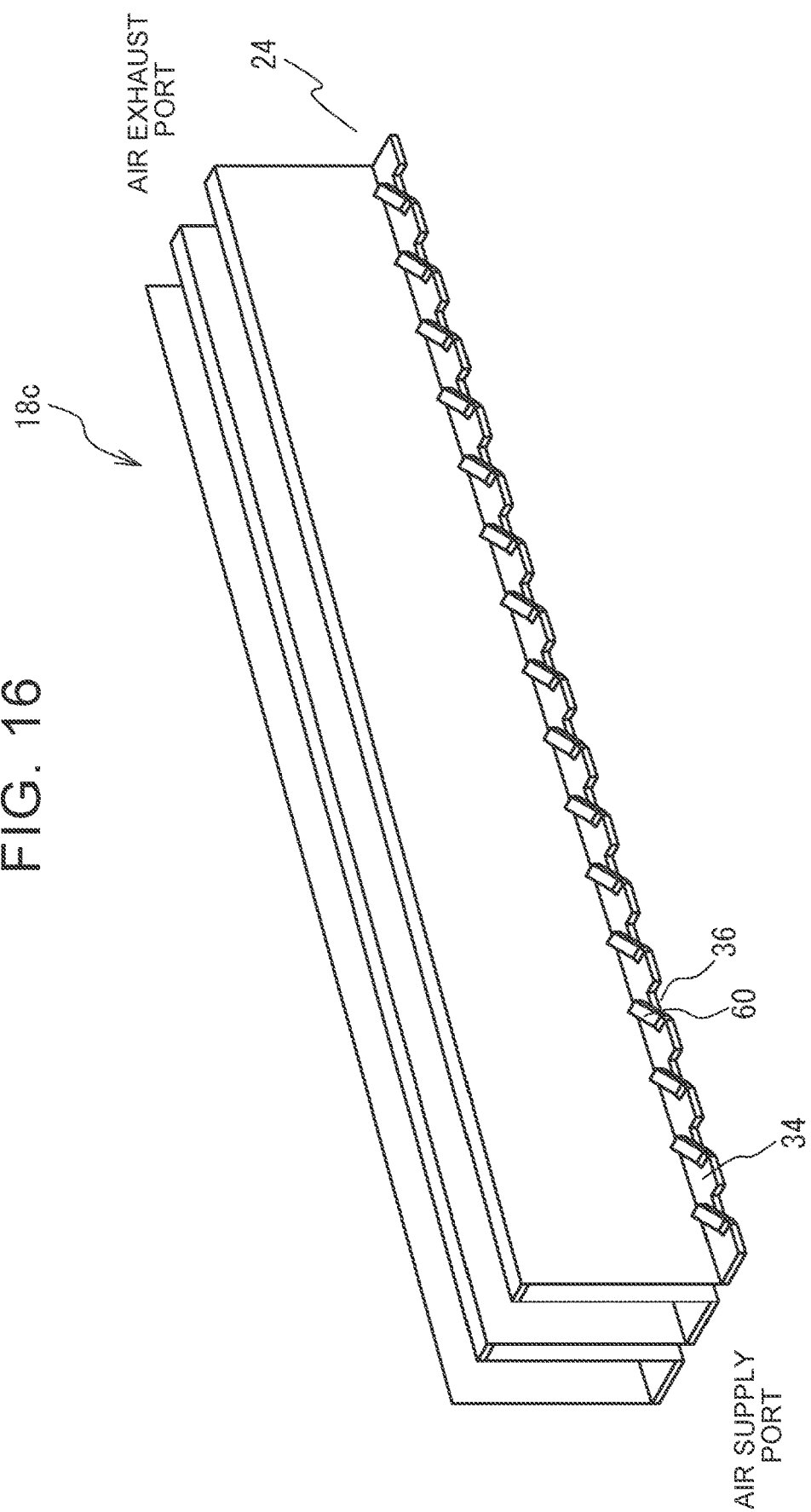
FIG. 16 is a perspective view (No. 2) of the cathode-side separator provided in the fuel cell of Example 3.

FIGS. 15 and 16 are perspective views of a cathode-side separator 18c provided in a fuel cell of Example 3. As illustrated in FIGS. 15 and 16, in the cathode-side separator 18c provided in the fuel cell of Example 3, portions defining penetration holes 36 having a rectangular shape are provided on a central side in a width direction of a second passage 24. In an upstream edge, on an upstream side of a flow of air, of an edge of the portion defining the penetration hole 36, a wall portion 60 projecting diagonally inwardly in the second passage 24 from a bottom face 34 of a second recessed portion 32 is provided. The wall portion 60 is provided so as to cover at least part of the portion defining the penetration hole 36, for example. The wall portion 60 is formed by bending or press working, for example. Further, a first passage 22 is narrower than the second passage 24, that is, the first passage 22 has a sectional area smaller than the second passage 24. When the sectional area of the second passage 24 is made relatively large, it is possible to improve cooling performance, and when the sectional area of the first passage 22 is made relatively small, it is possible to restrain the air flowing through the first passage 22 from removing moisture content. The other configurations of the fuel cell of Example 3 are the same as those in Example 1, so descriptions thereof are omitted.

In Example 3, the wall portion 60 projecting inwardly in the second passage 24 from the bottom face 34 of the second recessed portion 32 is provided in the upstream edge, on the upstream side of the flow of the air, of the edge of the portion defining the penetration hole 36. In a case where the portions defining the penetration holes 36 are provided on the bottom face 34 of the second recessed portion 32, moisture content in a MEA 10 is removed through the portions defining the penetration holes 36, so that the MEA 10 might dry and power generation performance might decrease. However, when the wall portions 60 are provided, the air flowing through the second passage 24 is turned upward by the wall portions 60, so that a flow speed of the air passing through a top face of a MEGA 20 exposed in the portions defining the penetration holes 36 slows down. This restrains the moisture content in the MEA 10 from being removed through the portions defining the penetration holes 36, thereby making it possible to restrain the drying of the MEA 10. This accordingly makes it possible to restrain a decrease in power generation performance.

Figure 17:
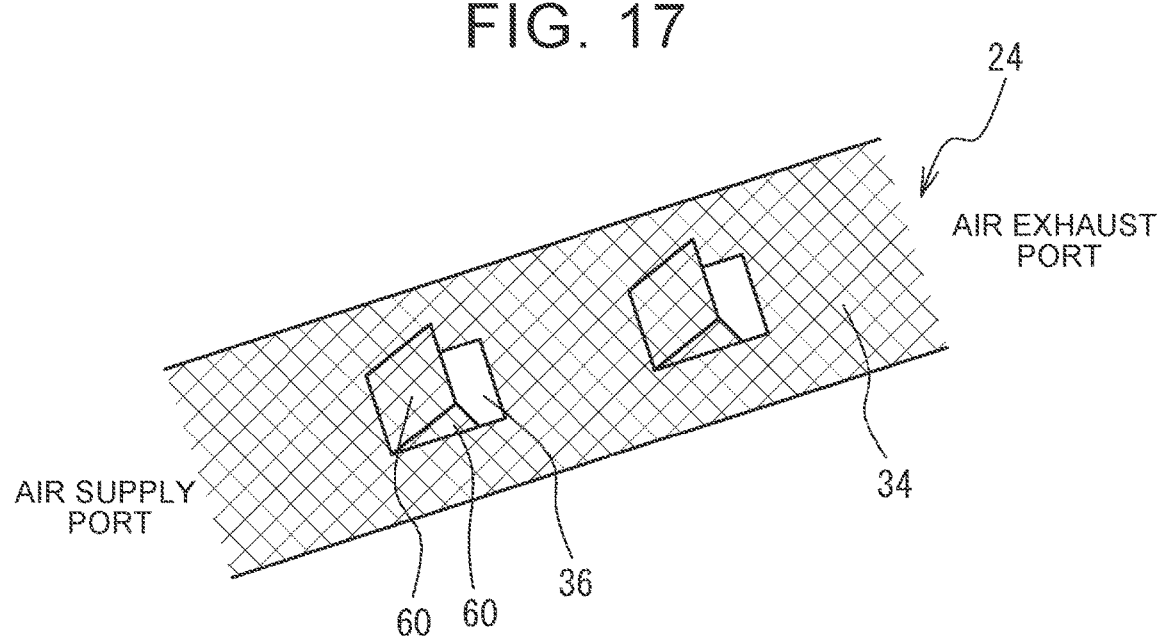
FIG. 17 is a perspective view of a second passage of a cathode-side separator provided in a fuel cell of Modified Example 1 of Example 3.

Note that Example 3 exemplifies a case where the wall portion 60 is provided only in the upstream edge of the edge of the portion defining the penetration hole 36, but the wall portion 60 is not limited to this case. FIG. 17 is a perspective view of a second passage 24 of a cathode-side separator 18c provided in a fuel cell of Modified Example 1 of Example 3. Note that, in FIG. 17, a bottom face 34 of a second recessed portion 32 constituting the second passage 24 and a wall portion 60 are indicated by a cross hatch. As illustrated in FIG. 17, in addition to an upstream edge of an edge of a portion defining a penetration hole 36, the wall portion 60 may be provided in a side edge along a flow of air. In this case, a flow speed of the air passing through a top face of a MEGA 20 exposed in the portion defining the penetration hole 36 slows down, which further restrains moisture content in a MEA 10 from being removed through the portion defining the penetration hole 36.

Figure 18A:
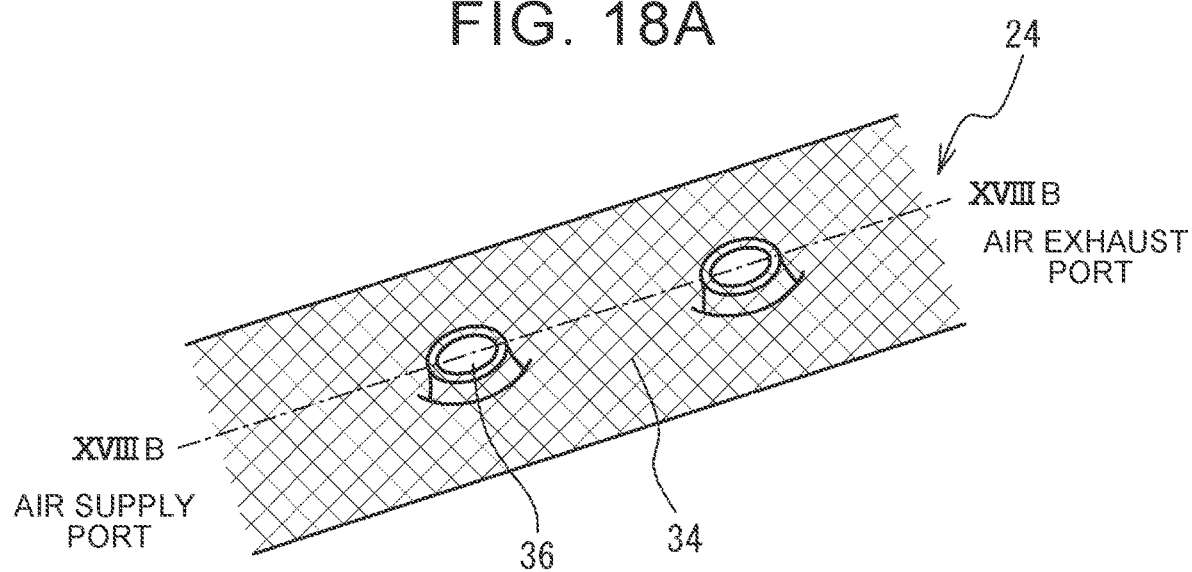
FIG. 18A is a perspective view of a second passage of a cathode-side separator provided in a fuel cell of Example 4.
Figure 18B:
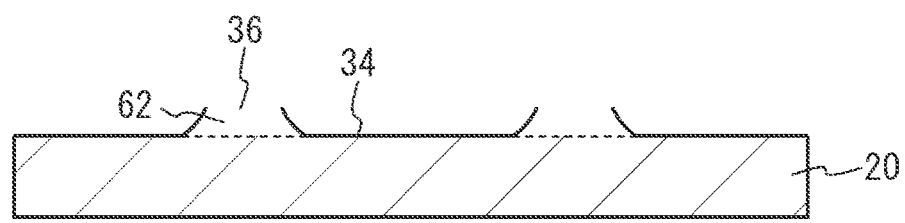
FIG. 18B is a sectional view taken along a line XVIIIB-XVIIIB in FIG. 18A.

FIG. 18A is a perspective view of a second passage 24 of a cathode-side separator 18c provided in a fuel cell of Example 4, and FIG. 18B is a sectional view taken along a line XVIIIB-XVIIIB in FIG. 18A. Note that, in FIG. 18A, a bottom face 34 of a second recessed portion 32 constituting the second passage 24 is indicated by a cross hatch. As illustrated in FIGS. 18A and 18B, in the cathode-side separator 18c provided in the fuel cell of Example 5, portions defining penetration holes 36 having a circular shape are provided on a central side in a width direction of the second passage 24. A part where the portion defining the penetration hole 36 is provided on the bottom face 34 of the second recessed portion 32 constituting the second passage 24 projects more than the other part of the bottom face 34 of the second recessed portion 32. Hereby, a relatively large gap 62 is formed between a top face of the portion defining the penetration hole 36 and a top face of a MEGA 20 exposed in the portion defining the penetration hole 36. Accordingly, a flow speed of air passing through the top face of the MEGA 20 slows down, which restrains moisture content in a MEA 10 from being removed through the portion defining the penetration hole 36.

Figure 19:
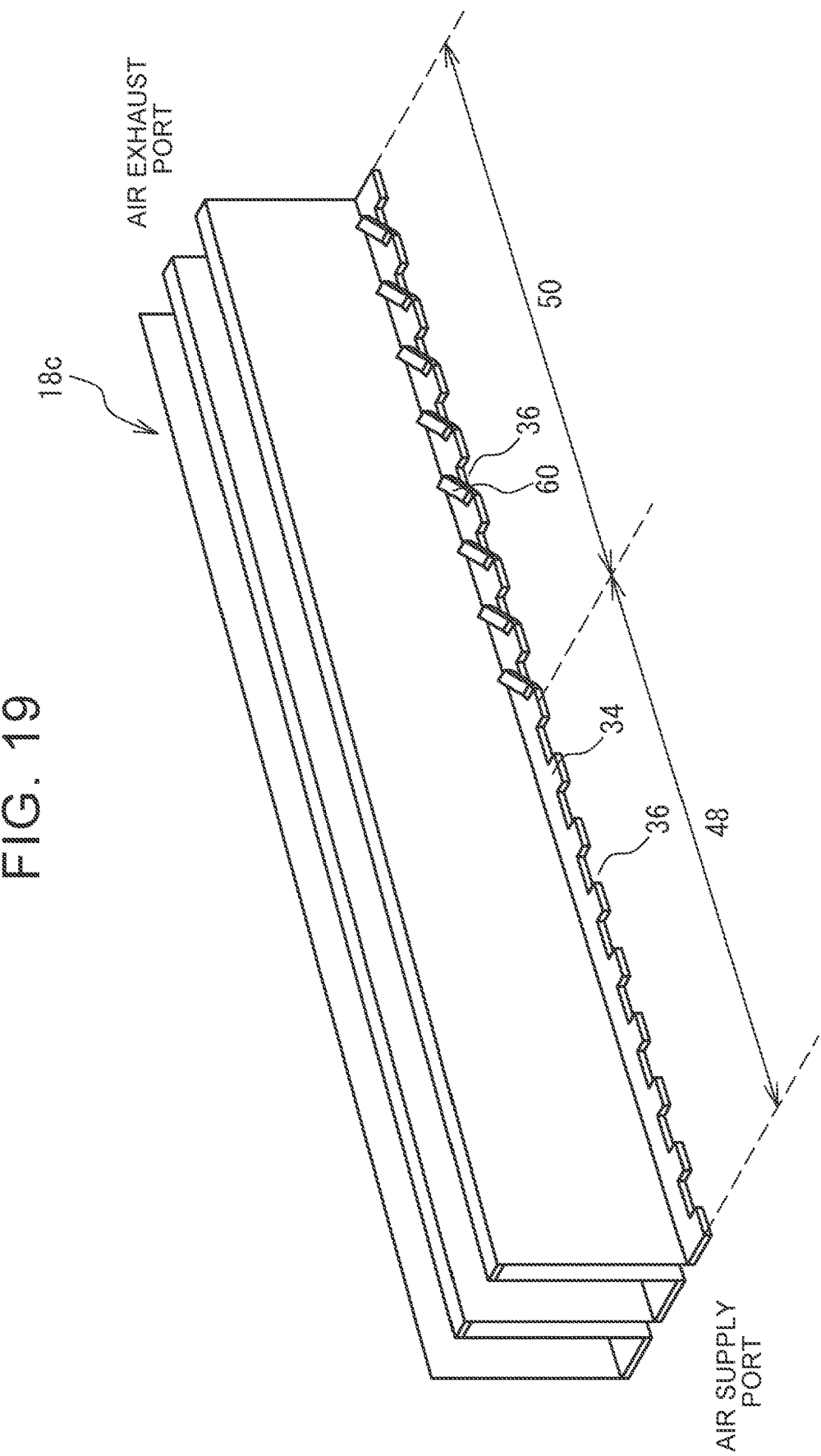
FIG. 19 is a perspective view of a cathode-side separator provided in a fuel cell of Example 5.

FIG. 19 is a perspective view of a cathode-side separator 18c provided in a fuel cell of Example 5. As illustrated in FIG. 19, in the cathode-side separator 18c provided in the fuel cell of Example 5, a wall portion 60 is not provided in a portion defining a penetration hole 36, provided in an upstream region 48, but the wall portion 60 is provided only in a portion defining a penetration hole 36, provided in a downstream region 50. As described in Example 2, in an operation under a low humidity condition, flooding due to excessive liquid water might occur on the upstream side, and drying of a MEA 10 might occur on the downstream side. On this account, as illustrated in Example 5, when the portion defining the penetration hole 36 without the wall portion 60 is provided on the upstream side, liquid water is promoted to be discharged from the portion defining the penetration hole 36 on the upstream side, thereby making it possible to restrain the occurrence of flooding. Further, when the portion defining the penetration hole 36 with the wall portion 60 is provided on the downstream side, liquid water can be hardly discharged from the portion defining the penetration hole 36 on the downstream side, thereby making it possible to restrain the drying of the MEA 10. Accordingly, with Example 5, even in a case of the operation under the low humidity condition, it is possible to restrain a decrease in power generation performance.

Note that Example 5 exemplifies a case where the wall portion 60 is not provided in the upstream region 48, which is on the upstream side relative to the middle of the second passage 24 in a lengthwise direction, and the wall portion 60 is provided only in the downstream region 50, which is on the downstream side relative to the middle of the second passage 24. However, the wall portion 60 is not limited to this case. The wall portion 60 may not be provided on the upstream side relative to a position other than the middle of the second passage 24 in the lengthwise direction, and the wall portion 60 may be provided on the downstream side relative to the position. That is, the portion defining the penetration hole 36 with the wall portion 60 should be provided on the downstream side of the second passage 24 relative to the portion defining the penetration hole 36 without the wall portion 60.

Figure 20:
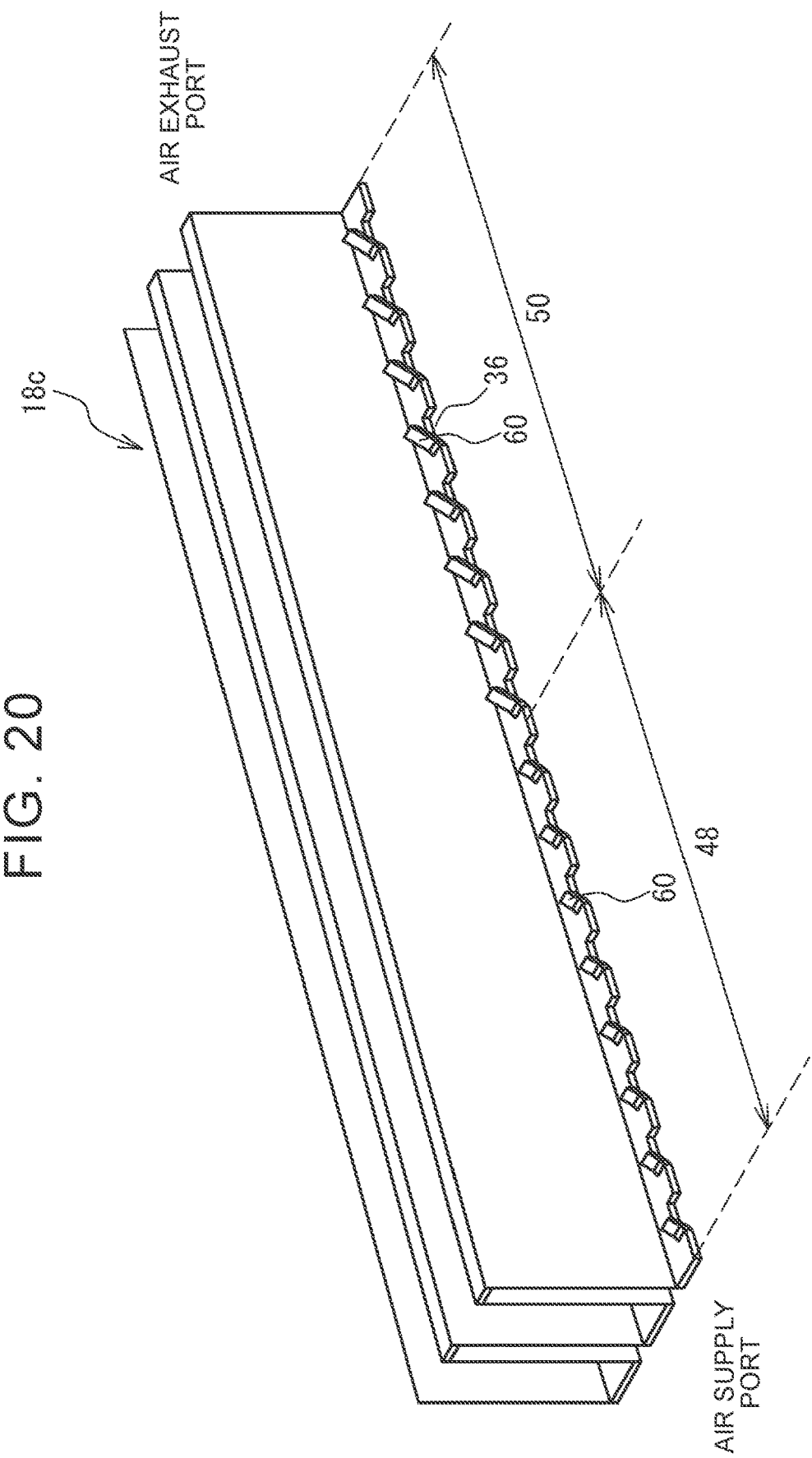
FIG. 20 is a perspective view of a cathode-side separator provided in a fuel cell of Example 6.

FIG. 20 is a perspective view of a cathode-side separator 18c provided in a fuel cell of Example 6. As illustrated in FIG. 20, in the cathode-side separator 18c provided in the fuel cell of Example 6, a height of a wall portion 60 provided in a downstream region 50 is higher than a height of a wall portion 60 provided in an upstream region 48. On this account, liquid water is easily discharged from portions defining penetration holes 36 on the upstream side, but liquid water can be hardly discharged from portions defining penetration holes 36 on the downstream side. Accordingly, even in a case of an operation under a low humidity condition, it is possible to restrain a decrease in power generation performance.

Note that Example 6 exemplifies a case where the height of the wall portion 60 provided in the downstream region 50, which is on the downstream side relative to the middle of the second passage 24 in a lengthwise direction, is higher than the height of the wall portion 60 provided in the upstream region 48, which is on the upstream side relative to the middle of the second passage 24. However, the wall portions 60 are not limited to this case. The height of the wall portion 60 provided on the downstream side relative to a position other than the middle of the second passage 24 in the lengthwise direction may be higher than the height of the wall portion 60 provided on the upstream side relative to the position. That is, the heights of the wall portions 60 should be set such that the height of the wall portion 60 on the downstream side of the second passage 24 is higher than the height of the wall portion 60 on the upstream of the second passage 24.

Figure 21:
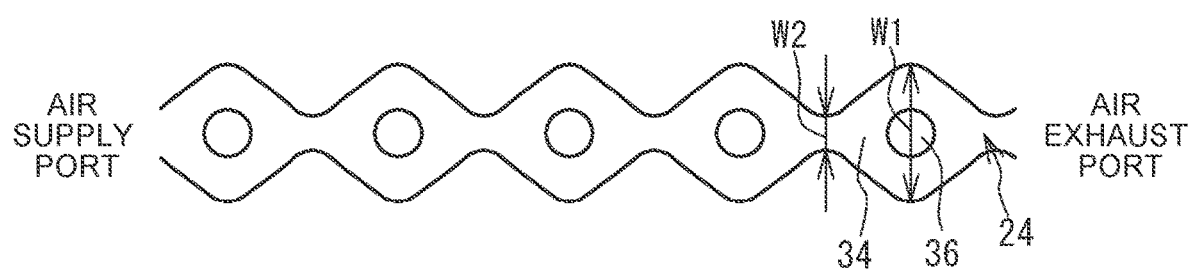
FIG. 21 is a plan view of a second passage of a cathode-side separator provided in a fuel cell of Example 7.

FIG. 21 is a plan view of a second passage 24 of a cathode-side separator 18c provided in a fuel cell of Example 7. As illustrated in FIG. 21, in the cathode-side separator 18c provided in the fuel cell of Example 7, a width W1 of a part of a second passage 24 in which a portion defining a penetration hole 36 is provided is wider than a width W2 of a part of the second passage 24 in which the portion defining the penetration hole 36 is not provided. That is, a sectional area of the second passage 24 is larger in the part where the portion defining the penetration hole 36 is provided than in the part where the portion defining the penetration hole 36 is not provided. When the width W1 of the part of the second passage 24 in which the portion defining the penetration hole 36 is provided is set to be wider than the width W2 of the part of the second passage 24 in which the portion defining the penetration hole 36 is not provided, a flow speed of air passing through a top face of a MEGA 20 exposed in the portion defining the penetration hole 36 slows down. This restrains moisture content in a MEA 10 from being removed through the portions defining the penetration holes 36, thereby making it possible to restrain the drying of the MEA 10. This accordingly makes it possible to restrain a decrease in power generation performance.

The examples of the present disclosure have been described above in detail, but the present disclosure is not limited to the specific examples, and various modifications and alternations can be made within the scope of the present disclosure described in Claims.

What is claimed is:
1. A fuel cell comprising:
a membrane electrode assembly; and
a cathode-side separator assembled to the membrane electrode assembly, the cathode-side separator includ- ing first passages provided on a first surface of the cathode-side separator on a side closer to the membrane electrode assembly, the first passages allowing oxidant gas to flow through the first passages, and second passages provided on a second surface of the cathode-side separator on a side opposite to the membrane electrode assembly across the first surface of the cathode-side separator, the second passages allowing oxidant gas to flow through the second passages, wherein the first passages include first recessed portions provided on the first surface so as to extend from one end of the cathode-side separator to an other end, the second passages include second recessed portions provided on the second surface so as to extend from the one end of the cathode-side separator to the other end and to be arranged alternately with the first recessed portions, a portion defining a penetration hole penetrating through the cathode-side separator is provided on a bottom face of the second recessed portion constituting the second passage, and a width of a part of the second passage in which the portion defining the penetration hole is provided is wider than a width of a part of the second passage in which the portion defining the penetration hole is not provided.

2. A fuel cell separator to be assembled to a membrane electrode assembly, the fuel cell separator comprising:

first recessed portions provided on one surface so as to extend from one end of the fuel cell separator to an other end; and second recessed portions provided on the other surface so as to extend from the one end of the fuel cell separator to the other end and to be arranged alternately with the first recessed portions, the second recessed portions each having a bottom face provided with a portion defining a penetration hole penetrating through the fuel cell separator, wherein a width of a part of the second recessed portion in which the portion defining the penetration hole is provided is wider than a width of a part of the second recessed portion in which the portion defining the penetration hole is not provided.

\* \* \* \* \*